(12) United States Patent
Fan et al.

(10) Patent No.: US 12,272,335 B2
(45) Date of Patent: Apr. 8, 2025

(54) DISPLAY SYNCHRONIZATION METHOD, ELECTRONIC DEVICE, AND READABLE STORAGE MEDIUM

(71) Applicant: Huawei Technologies Co., Ltd., Shenzhen (CN)

(72) Inventors: Weiwei Fan, Shanghai (CN); Ming Chang, Shanghai (CN); Hongli Wang, Shanghai (CN); Xiaowen Cao, Shanghai (CN); Wenhao Jiang, Shanghai (CN); Siqing Du, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/332,868

(22) Filed: Jun. 12, 2023

(65) Prior Publication Data

US 2023/0335081 A1 Oct. 19, 2023

Related U.S. Application Data

(63) Continuation of application No. PCT/CN2021/136831, filed on Dec. 9, 2021.

(30) Foreign Application Priority Data

Dec. 11, 2020 (CN) .......................... 202011464391.4

(51) Int. Cl.
*H04N 21/442* (2011.01)
*G06F 1/3287* (2019.01)
(Continued)

(52) U.S. Cl.
CPC ................. *G09G 5/18* (2013.01); *G09G 5/12* (2013.01); *H04N 7/10* (2013.01); *G09G 2310/08* (2013.01); *G09G 2340/16* (2013.01)

(58) Field of Classification Search
CPC ........ G09G 5/18; G09G 5/12; G09G 2310/08; G09G 2340/19; H04N 7/10
See application file for complete search history.

(56) References Cited

U.S. PATENT DOCUMENTS

2004/0268397 A1* 12/2004 Dunbar .............. H04N 21/4325
386/E5.052
2014/0267905 A1* 9/2014 Lee .................. H04N 21/44231
348/462

(Continued)

FOREIGN PATENT DOCUMENTS

CN 103916668 A 7/2014
CN 107633796 A * 1/2018 ............... G09G 3/20

*Primary Examiner* — Lin Li
(74) *Attorney, Agent, or Firm* — Conley Rose, P.C.

(57) ABSTRACT

A method includes: a processor that obtains several lines of data in to-be-displayed display data to generate a data block; generates a synchronization flag corresponding to the data block; encapsulates the data block and the synchronization flag corresponding to the data block to obtain a data packet corresponding to the data block; and sends all data packets corresponding to the display data to the display system. The display system sequentially parses all the data packets sent by the processor to obtain a synchronization flag associated with each data packet, and determines a display location of each data block on a display panel based on the synchronization flag to display the display data.

20 Claims, 19 Drawing Sheets

(51) Int. Cl.
  *G09G 5/00*      (2006.01)
  *G09G 5/12*      (2006.01)
  *G09G 5/18*      (2006.01)
  *H04N 7/10*      (2006.01)
  *H04N 21/432*    (2011.01)

(56) References Cited

U.S. PATENT DOCUMENTS

2018/0018927 A1\* 1/2018 Amirkhany ............ G09G 5/006
2021/0065602 A1\* 3/2021 Lee ....................... G06F 1/3287

\* cited by examiner

DISPLAY SYNCHRONIZATION METHOD, ELECTRONIC DEVICE, AND READABLE STORAGE MEDIUM

CROSS-REFERENCE TO RELATED APPLICATIONS

This is a continuation of International Patent Application No. PCT/CN2021/136831 filed on Dec. 9, 2021, which claims priority to Chinese Patent Application No. 202011464391.4 filed on Dec. 11, 2020. The disclosures of the aforementioned applications are hereby incorporated by reference in their entireties.

TECHNICAL FIELD

This disclosure pertains to the field of data processing technologies, and in particular, to a display synchronization method, an electronic device, and a readable storage medium.

BACKGROUND

When an electronic device displays display data such as an image or a video, display synchronization needs to be completed between a processor and a display module, to ensure that the display data is completely and accurately displayed, and avoid screen-splitting or tearing of a picture. In an existing display synchronization technology, before the processor sends the display data to the display module, the processor needs to first send a synchronization short packet for display synchronization to the display module. This increases transmission duration of the display data, and affects transmission efficiency of the display data.

SUMMARY

Embodiments of this disclosure provide a display synchronization method and apparatus, an electronic device, and a computer-readable storage medium, so that display synchronization can be implemented without sending an additional synchronization short packet. This effectively improves transmission efficiency of display data, and reduces energy consumption of an electronic device.

According to a first aspect, an embodiment of this disclosure provides a display synchronization method, applied to an electronic device. The electronic device includes a processor and a display module, and the method includes that the processor obtains several lines of data in to-be-displayed display data to generate a data block, the processor generates a synchronization flag corresponding to the data block, the processor encapsulates the data block and the synchronization flag corresponding to the data block to obtain a data packet corresponding to the data block, the processor sequentially sends all data packets corresponding to the display data to the display module, and the display module sequentially parses all received data packets to obtain a data block and a corresponding synchronization flag in each data packet, and determines a display location of the data block corresponding to the synchronization flag on a display panel of the display module based on the synchronization flag to display the display data.

Beneficial effects of implementing embodiments of this disclosure are as follows. The display data is divided to generate a plurality of data blocks, a corresponding synchronization flag is configured for each data block, the synchronization flag and the data block are encapsulated in a data packet, and the data packet is sent to the display module. After receiving the data packet that includes the data block and the synchronization flag, the display module may determine a display location of the associated data block based on the synchronization flag, to restore the display data and display the display data on the display panel. This implements display synchronization between the processor and the display module of the electronic device. Compared with that in an existing display synchronization technology, an additional synchronization short packet does not need to be sent, and therefore the electronic device does not need to frequently enter a high-speed transmission mode, so that energy consumption of the electronic device is reduced. In addition, the foregoing synchronization flag transmission manner does not depend on a dedicated signal line or a bidirectional transmission line to transmit the synchronization flag, and does not increase cabling difficulty of the electronic device, so that costs of the electronic device are reduced.

In a possible implementation of the first aspect, that the processor encapsulates the data block and the synchronization flag corresponding to the data block to obtain a data packet corresponding to the data block includes that the processor uses the synchronization flag as a value of a preset first field in a data packet template, and adds the data block to a preset second field in the data packet template, to obtain the data packet.

In a possible implementation of the first aspect, if the processor includes a first time sequence controller, that the processor obtains several lines of data in to-be-displayed display data to generate a data block includes that the processor sequentially extracts all frames of image data from the display data at a preset refresh frequency by using the first time sequence controller, and the processor reads several lines of data in the image data based on a preset sending slot by using the first time sequence controller, to generate the data block.

In a possible implementation of the first aspect, that the processor sequentially sends all data packets to the display module includes that the processor sequentially sends all data blocks to the display module based on the sending slot.

In a possible implementation of the first aspect, if the display module includes a second time sequence controller and a second cache area, the sequentially parsing all the data packets sent by the processor to obtain a data block and a corresponding synchronization flag in each data packet, and determining a display location of each data block on a display panel of the display module based on the synchronization flag to display the display data includes that the display module sequentially parses all the received data packets to obtain the data block and the corresponding synchronization flag in each data packet, and determines a reading slot between all the data packets based on the synchronization flag, the display module stores the received data packets in the second cache area, the display module sequentially reads all the data packets from the second cache area based on the reading slot by using the second time sequence controller, and the display module determines the display location of the data block in the data packet on the display panel based on the synchronization flag in the data packet, to display each piece of display data.

According to a second aspect, an embodiment of this disclosure provides a display synchronization apparatus, including a processor configured to obtain several lines of data in to-be-displayed display data to generate a data block.

The processor is configured to generate a synchronization flag corresponding to the data block.

The processor is configured to encapsulate the data block and the synchronization flag corresponding to the data block to obtain a data packet corresponding to the data block.

The processor is configured to sequentially send all data packets corresponding to the display data to a display module.

The display module is configured to sequentially parse all received data packets to obtain a data block and a corresponding synchronization flag in each data packet, and determine a display location of the data block corresponding to the synchronization flag on a display panel of the display module based on the synchronization flag to display the display data.

In a possible implementation of the second aspect, that the processor is configured to encapsulate the data block and the synchronization flag corresponding to the data block to obtain a data packet corresponding to the data block includes that the processor is configured to use the synchronization flag as a value of a preset first field in a data packet template, and add the data block to a preset second field in the data packet template, to obtain the data packet.

In a possible implementation of the second aspect, if the processor includes a first time sequence controller, that the processor is configured to obtain several lines of data in to-be-displayed display data to generate a data block includes that the processor is configured to sequentially extract all frames of image data from the display data at a preset refresh frequency by using the first time sequence controller, and the processor is configured to read several lines of data in the image data based on a preset sending slot by using the first time sequence controller, to generate the data block.

In a possible implementation of the second aspect, that the processor is configured to sequentially send all data packets to a display module includes that the processor is configured to sequentially send all data blocks to the display module based on the sending slot.

In a possible implementation of the second aspect, if the display module includes a second time sequence controller and a second cache area, that the display module is configured to sequentially parse all the data packets sent by the processor to obtain a data block and a corresponding synchronization flag in each data packet, and determine a display location of each data block on a display panel of the display module based on the synchronization flag to display the display data includes that the display module is configured to sequentially parse all the received data packets to obtain the data block and the corresponding synchronization flag in each data packet, and determine a reading slot between all the data packets based on the synchronization flag, the display module is configured to store the received data packets in the second cache area, the display module is configured to sequentially read all the data packets from the second cache area based on the reading slot by using the second time sequence controller, and the display module is configured to determine the display location of the data block in the data packet on the display panel based on the synchronization flag in the data packet, to display each piece of display data.

According to a third aspect, an embodiment of this disclosure provides a display synchronization method, applied to a processor of an electronic device, and including that the processor obtains several lines of data in to-be-displayed display data to generate a data block, the processor generates a synchronization flag corresponding to the data block, the processor encapsulates the data block and the synchronization flag corresponding to the data block to obtain a data packet corresponding to the data block, and the processor sequentially sends all data packets corresponding to the display data to a display module, so that the display module sequentially parses all received data packets to obtain a data block and a corresponding synchronization flag in each data packet, and determines a display location of the corresponding data block on a display panel of the display module based on the synchronization flag to display the display data.

In a possible implementation of the third aspect, that the processor obtains several lines of data in to-be-displayed display data to generate a data block includes that the processor sequentially extracts all frames of image data from the display data at a preset refresh frequency by using a first time sequence controller, and the processor reads several lines of data in the image data based on a preset sending slot by using the first time sequence controller, to generate the data block.

In a possible implementation of the third aspect, that the processor sequentially sends all data packets to a display module includes that the processor sequentially sends all data blocks to the display module based on the sending slot.

In a possible implementation of the third aspect, that the processor encapsulates the data block and the synchronization flag corresponding to the data block to obtain a data packet corresponding to the data block includes that the processor uses the synchronization flag as a value of a preset first field in a data packet template, and adds the data block to a preset second field in the data packet template, to obtain the data packet.

According to a fourth aspect, an embodiment of this disclosure provides a display synchronization method, applied to a display module of an electronic device, and including that the display module sequentially receives a plurality of data packets sent by a processor, where each data packet includes a data block and a synchronization flag corresponding to the data block, and each data block includes several lines of data in to-be-displayed display data, and the display module sequentially parses all the received data packets to obtain the data block and the corresponding synchronization flag in each data packet, and determines a display location of the corresponding data block on a display panel of the display module based on the synchronization flag to display the display data.

In a possible implementation of the fourth aspect, if the display module includes a second time sequence controller and a second cache area, that the display module sequentially parses all the received data packets to obtain the data block and the corresponding synchronization flag in each data packet, and determines a display location of the corresponding data block on a display panel of the display module based on the synchronization flag to display the display data includes that the display module sequentially parses all the received data packets to obtain the data block and the corresponding synchronization flag in each data packet, and determines a reading slot between all the data packets based on the synchronization flag, the display module stores the received data packets in the second cache area, the display module sequentially reads all the data packets from the second cache area based on the reading slot by using the second time sequence controller, and the display module determines the display location of the data block in the data packet on the display panel based on the synchronization flag in the data packet, to display each piece of display data.

According to a fifth aspect, an embodiment of this disclosure provides an electronic device, including a memory, a processor, and a computer program that is stored in the memory and that can be run on the processor. When executing the computer program, the processor implements the display synchronization method according to any one of the first aspect, any one of the third aspect, or any one of the fourth aspect.

According to a sixth aspect, an embodiment of this disclosure provides a computer-readable storage medium. The computer-readable storage medium stores a computer program, and when the computer program is executed by a processor, the display synchronization method according to any one of the first aspect, any one of the third aspect, or any one of the fourth aspect is implemented.

According to a seventh aspect, an embodiment of this disclosure provides a computer program product. When the computer program product runs on an electronic device, the electronic device is enabled to perform the display synchronization method according to any one of the first aspect, any one of the third aspect, or any one of the fourth aspect.

According to an eighth aspect, an embodiment of this disclosure provides a chip system, including a processor and a display module. The processor is coupled to a memory, and the processor executes a computer program stored in the memory, to implement the display synchronization method according to any one of the first aspect, any one of the third aspect, or any one of the fourth aspect.

It may be understood that, for beneficial effects of the second aspect to the eighth aspect, refer to related descriptions in the first aspect. Details are not described herein again.

DESCRIPTION OF EMBODIMENTS

Figure 1:
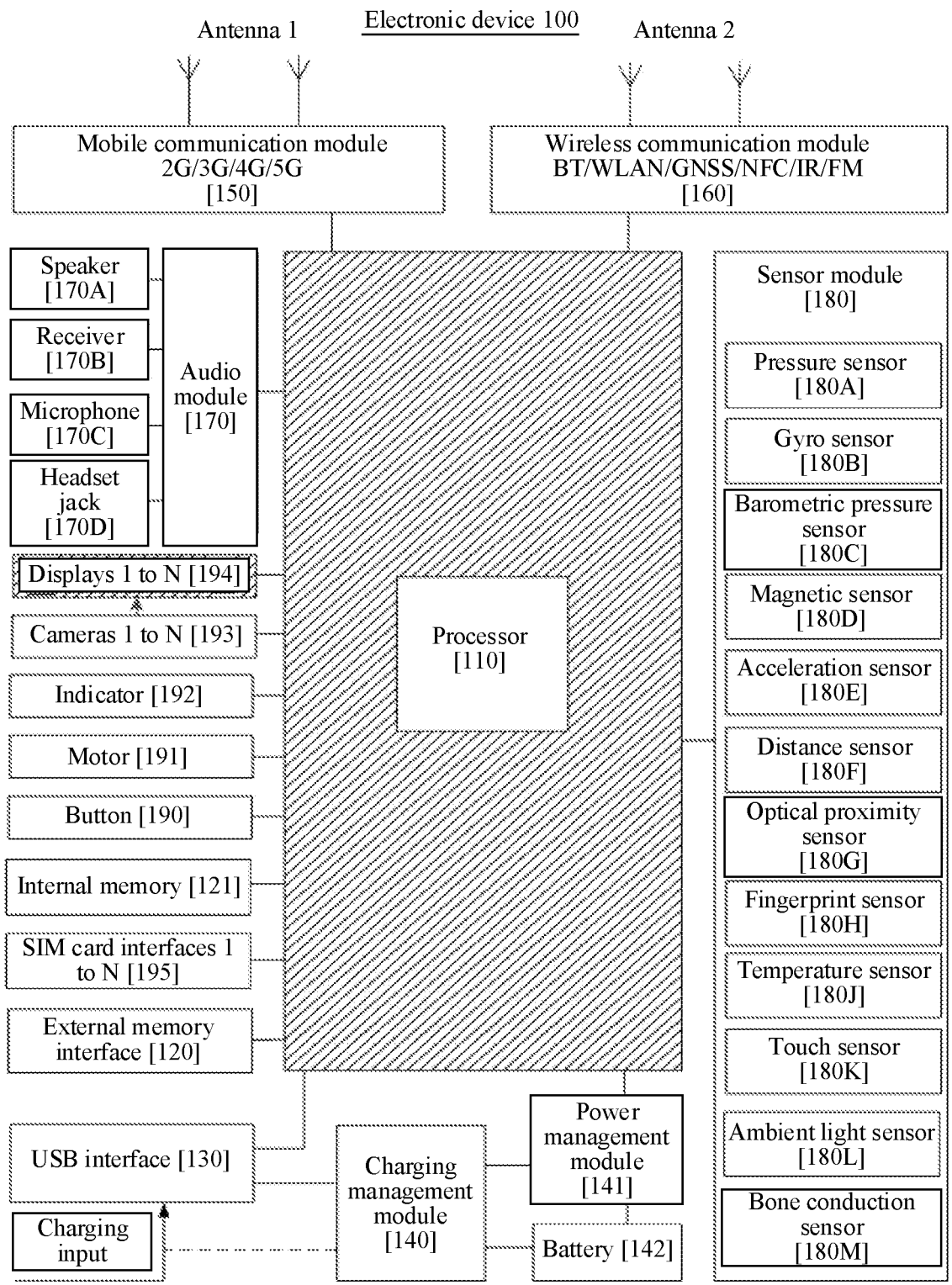
FIG. 1 is a schematic diagram of a structure of an electronic device according to an embodiment of this disclosure.

In the following descriptions, for illustration instead of limitation, specific details such as a particular system structure and a technology are provided to make a thorough understanding of embodiments of this disclosure. However, persons skilled in the art should know that this disclosure may also be implemented in other embodiments without these specific details. In other cases, detailed descriptions of well-known systems, apparatuses, circuits, and methods are omitted, so that this disclosure is described without being obscured by unnecessary details.

It should be understood that when being used in the specification and the appended claims of this disclosure, the term "include" indicates the presence of a described feature, entirety, step, operation, element, and/or component, but does not exclude the presence or addition of one or more other features, entireties, steps, operations, elements, components, and/or sets thereof.

It should be further understood that the term "and/or" used in the specification and the appended claims of this disclosure refers to any combination and all possible combinations of one or more associated listed items, and includes these combinations.

As used in the specification and the appended claims of this disclosure, according to the context, the term "if" may be interpreted as "when" or "once" or "in response to determining" or "in response to detecting". Likewise, the phrase "if it is determined that" or "if (a described condition or event) is detected" may be interpreted as a meaning of "once it is determined that" or "in response to determining" or "once (a described condition or event) is detected" or "in response to detecting (a described condition or event)" depending on the context.

In addition, in the description of the specification and the appended claims of this disclosure, the terms "first", "second", "third", and the like are merely used for distinguishing, but cannot be construed as indicating or implying relative importance. "A plurality of" mentioned in this disclosure means two or more than two.

Reference to "an embodiment", "some embodiments", or the like described in the specification of this disclosure indicates that one or more embodiments of this disclosure include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise emphasized in another manner. The terms "include", "contain", "have", and variations thereof all mean "including but not limited to", unless otherwise emphasized in another manner.

A display synchronization method provided in embodiments of this disclosure may be applied to an electronic device such as a mobile phone, a tablet computer, a wearable device, a vehicle-mounted device, an augmented reality (AR)/virtual reality (VR) device, a notebook computer, an ultra-mobile personal computer (UMPC), a netbook, or a personal digital assistant (PDA). A specific type of the electronic device is not limited in embodiments of this disclosure.

For example, the electronic device may be a station (ST) in a WLAN, or may be a cellular phone, a cordless phone, a Session Initiation Protocol (SIP) phone, a wireless local loop (WLL) station, a PDA device, a handheld device with a wireless communication function, a computing device, another processing device connected to a wireless modem, a computer, a laptop computer, a handheld communication device, a handheld computing device, another device used for communication in a wireless system, a mobile terminal in a next-generation communication system such as a fifth generation (5G) network, and/or a mobile terminal in a future evolved public land mobile network (PLMN).

FIG. 1 is a schematic diagram of a structure of an electronic device 100.

The electronic device 100 may include a processor 110, an external memory interface 120, an internal memory 121, a Universal Serial Bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this disclosure does not constitute a specific limitation on the electronic device 100. In some other embodiments of this disclosure, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on instruction operation code and a time sequence signal, to complete control of instruction fetching and instruction execution.

A memory may be further disposed in the processor 110, to store instructions and data. In some embodiments, the memory in the processor 110 is a cache. The memory may store instructions or data just used or cyclically used by the processor 110. If the processor 110 needs to use the instructions or data again, the instructions or data may be directly invoked from the memory. This avoids repeated access, and reduces waiting time of the processor 110, so that system efficiency is improved.

In some embodiments, the processor 110 may include one or more interfaces. The interface may include an Inter-Integrated Circuit (I2C) interface, an I2C Sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB interface, and/or the like.

Figure 13A:
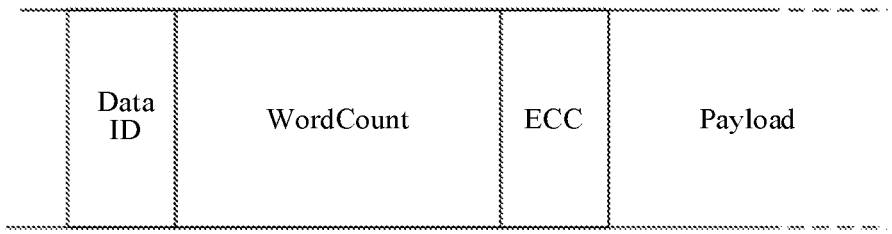
FIG. 13A and FIG. 13B are diagrams of comparison between a packet header format of a data long packet in a Display Serial Interface (DSI) protocol and a packet header format of a data packet newly defined in this disclosure.

A MIPI-DSI interface is a serial interface that is commonly used by an existing electronic device and that is applied to a display technology. A processor sends a data packet or a command to a display module in a serial manner, and reads the data packet or status information in the command from the display device. In addition, in a transmission process, the processor has an independent MIPI-DSI communication protocol, including a data packet format and an error detection and correction mechanism. Data packets transmitted by the MIPI-DSI may be classified into a short packet and a long packet. The short packet may include 4 bytes: a 2-bit virtual channel identifier, a 6-bit data type, 2 bytes for representing a command, and an 8-bit error-correcting code (ECC). The short packet may be used to transmit most commands and related parameters in the MIPI-DSI interface. The long packet may include three parts: a 32-bit packet header, a dedicated data payload with a variable quantity of bytes, and a 16-bit packet tail. Further, as shown in FIG. 13A, the 32-bit packet header of the long packet may include three parts: an 8-bit data identifier (a 2-bit virtual channel identifier and a 6-bit data type), a 16-bit payload count, and an 8-bit error-correcting code. The packet tail of the long packet may include one part, that is, a 16-bit cyclic redundancy check (CRC) code. A byte length of the long packet may range from 6 bytes to 65541 bytes, and the long packet may be used to transmit large-block video data and other data.

The I2C interface is a two-way synchronous serial bus, and includes a serial data line (SDL) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K by using an I2C interface, so that the processor 110 communicates with the touch sensor 180K by using the I2C bus interface, to implement a touch function of the electronic device 100.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transmit an audio signal to the wireless communication module 160 through the I2S interface, to implement a function of answering a call by using a BLUETOOTH headset.

The PCM interface may be configured to perform audio communication, and sample, quantize, and code analog signals. In some embodiments, the audio module 170 may be coupled to the wireless communication module 160 by using a PCM bus interface. In some embodiments, the audio module 170 may also transmit an audio signal to the wireless communication module 160 through the PCM interface, to implement a function of answering a call by using a BLUETOOTH headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a BLUETOOTH module in the wireless communication module 160 by using the UART interface, to implement a BLUETOOTH function. In some embodiments, the audio module 170 may transmit an audio signal to the wireless communication module 160 through the UART interface, to implement a function of playing music by using a BLUETOOTH headset.

The MIPI interface may be configured to connect the processor 110 to a peripheral component such as the display 194 or the camera 193. The MIPI interface includes a camera serial interface (CSI), a DSI, and the like. In some embodiments, the processor 110 and the camera 193 communicate with each other by using the CSI interface, to implement a photographing function of the electronic device 100. The processor 110 communicates with the display 194 by using the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communication module 160, the audio module 170, the sensor module 180, and the like. The GPIO interface may alternatively be configured as the I2C interface, the I2S interface, the UART interface, the MIPI interface, or the like.

The USB interface 130 is an interface conforming to a USB standard specification, and may be further a mini USB interface, a micro USB interface, a USB Type-C interface, or the like. The USB interface 130 may be configured to connect to a charger to charge the electronic device 100, or may be configured to transmit data between the electronic device 100 and a peripheral device, or may be configured to connect to a headset to play audio by using the headset. The interface may alternatively be configured to connect to another electronic device, such as an AR device.

It may be understood that the interface connection relationship between the modules shown in this embodiment of this disclosure is merely an example, and does not constitute a limitation on the structure of the electronic device 100. In some other embodiments of this disclosure, the electronic device 100 may alternatively use an interface connection manner different from that in the foregoing embodiment, or a combination of a plurality of interface connection manners.

The charging management module 140 is configured to receive charging input from a charger. The charger may be a wireless charger, or may be a wired charger. In some wired charging embodiments, the charging management module 140 may receive charging input from a wired charger through the USB interface 130. In some wireless charging embodiments, the charging management module 140 may receive wireless charging input through a wireless charging coil of the electronic device 100. When charging the battery 142, the charging management module 140 may further supply power to the electronic device through the power management module 141.

The power management module 141 is configured to connect the battery 142, the charging management module 140, and the processor 110. The power management module 141 receives input of the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communication module 150 may provide a solution for wireless communication, including second generation (2G)/third generation (3G)/fourth generation (4G)/

5G and the like, that is applied to the electronic device 100. The mobile communication module 150 may include at least one filter, a switch, a power amplifier, a low noise amplifier (LNA), and the like. The mobile communication module 150 may receive an electromagnetic wave by using the antenna 1, perform processing such as filtering and amplification on the received electromagnetic wave, and send a processed electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some function modules of the mobile communication module 150 may be disposed in a same component as at least some modules of the processor 110.

The modem processor may include a modulator and a demodulator. The modulator is configured to adjust a to-be-sent low-frequency baseband signal to a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110 and disposed in a same device as the mobile communication module 150 or another function module.

The wireless communication module 160 may provide a solution for wireless communication that is applied to the electronic device 100 and that includes a wireless local area network (WLAN) (such as a WI-FI network), BLUETOOTH (BT), a global navigation satellite system (GNSS), frequency modulation (FM), near field communication (NFC), an infrared (IR) technology, and the like. The wireless communication module 160 may be one or more components that integrate at least one communication processing module. The wireless communication module 160 receives an electromagnetic wave through the antenna 2, performs frequency modulation and filtering on an electromagnetic wave signal, and sends a processed signal to the processor 110. The wireless communication module 160 may further receive a to-be-sent signal from the processor 110, perform frequency modulation and amplification on the to-be-sent signal, and convert the to-be-sent signal into an electromagnetic wave for radiation through the antenna 2.

In some embodiments, in the electronic device 100, the antenna 1 is coupled to the mobile communication module 150, and the antenna 2 is coupled to the wireless communication module 160, so that the electronic device 100 can communicate with a network and another device according to a wireless communication technology. The wireless communication technology may include a Global System for Mobile Communications (GSM), a General Packet Radio Service (GPRS), code-division multiple access (CDMA), wideband CDMA (WCDMA), time-division CDMA (TD-CDMA), Long-Term Evolution (LTE), BT, GNSS, WLAN, NFC, FM, an IR technology, and/or the like. The GNSS may include a Global Positioning System (GPS), a global navigation satellite system (GLONASS), a BEIDOU navigation satellite system (BDS), a quasi-zenith satellite system (QZSS), and/or a satellite based augmentation system (SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation and render graphics. The processor 110 may include one or more GPUs that execute program instructions to generate or change display information.

The display 194 is configured to display an image, a video, and the like. The display 194 includes a display panel. The display panel may be a liquid-crystal display (LCD), an organic light-emitting diode (LED) (OLED), an active-matrix OLED (AMOLED), a flexible LED (FLED), a mini-LED, a micro-LED, a micro-OLED, a quantum dot LED (QLED), or the like. In some embodiments, the electronic device 100 may include one or N displays 194, where N is a positive integer greater than 1. The display 194 may include a touch panel and another input device.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, luminance, and complexion of the image. The ISP may further optimize parameters such as exposure and a color temperature of a photographing scenario. In some embodiments, the ISP may be disposed in the camera 193.

The camera 193 is configured to capture a still image or a video. An optical image of an object is generated by using a lens and projected onto a photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for conversion into a digital image signal. The ISP outputs the digital image signal to the DSP for processing. The DSP converts the digital image signal into a standard image signal in a format such as red, green, and blue (RGB) or luma, blue projection, and red projection (YUV). In some embodiments, the electronic device 100 may include one or N cameras 193, where N is a positive integer greater than 1.

The digital signal processor is configured to process a digital signal. In addition to processing a digital image signal, the digital signal processor may further process another digital signal. For example, when the electronic device 100 selects a frequency, the digital signal processor is configured to perform Fourier transform or the like on frequency energy.

The video codec is configured to compress or decompress a digital video. The electronic device 100 may support one or more types of video codecs. In this way, the electronic device 100 may play or record videos in a plurality of coding formats, for example, Moving Picture Experts Group (MPEG)-1, MPEG-2, MPEG-3, and MPEG-4.

The NPU is a neural-network (NN) computing processor that processes input information rapidly by referring to a structure of a biological neural network, for example, by referring to a transmission mode between human brain neurons, and can further perform self-learning continuously. The NPU may be used to implement applications such as intelligent cognition of the electronic device 100, for example, image recognition, facial recognition, voice recognition, and text understanding.

The external memory interface 120 may be configured to connect to an external memory card, such as a micro Secure Digital (SD) card, to extend a storage capability of the electronic device 100. The external memory card communicates with the processor 110 through the external memory interface 120, to implement a data storage function. For example, files such as music or videos are stored in the external memory card.

The internal memory 121 may be configured to store computer executable program code, where the executable program code includes instructions. The internal memory 121 may include a program storage area and a data storage area. The program storage area may store an operating system, an application program required by at least one function (for example, a sound play function or an image play function), and the like. The data storage area may store data (such as audio data or a phone book) created in a use process of the electronic device 100. In addition, the internal memory 121 may include a high-speed random-access memory (RAM), and may further include a non-volatile memory, such as at least one magnetic disk storage component, a flash memory component, and a Universal Flash Storage (UFS). The processor 110 performs various function applications and data processing of the electronic device 100 by running the instructions stored in the internal memory 121 and/or instructions stored in the memory disposed in the processor.

The electronic device 100 may implement an audio function, such as music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode audio signals. In some embodiments, the audio module 170 may be disposed in the processor 110, or some function modules of the audio module 170 may be disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending a voice message, the user may make a sound near the microphone 170C through the mouth, to enter a sound signal to the microphone 170C. At least one microphone 170C may be disposed on the electronic device 100. In some other embodiments, two microphones 170C may be disposed on the electronic device 100. In addition to sound signal collection, a noise reduction function may be further implemented. In some other embodiments, three, four, or more microphones 170C may be alternatively disposed on the electronic device 100, to collect a sound signal, implement noise reduction, recognize a sound source, implement a directional recording function, and the like.

The headset jack 170D is configured to connect to a wired headset. The headset jack 170D may be the USB interface 130, or may be a 3.5 millimeter (mm) open mobile terminal platform (OMTP) standard interface or a cellular telecommunications industry association of the United States of America (USA) (CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines strength of the pressure based on the change of the capacitance. When a touch operation is performed on the display 194, the electronic device 100 detects strength of the touch operation through the pressure sensor 180A. The electronic device 100 may also calculate a position of the touch based on a detection signal of the pressure sensor 180A. In some embodiments, touch operations performed on a same touch position but has different touch operation strength may correspond to different operation instructions. For example, when a touch operation whose touch operation strength is less than a first pressure threshold is applied to a Messages icon, an instruction for viewing a Short Message Service (SMS) message is executed. When a touch operation whose touch operation strength is greater than or equal to the first pressure threshold is applied to the Messages icon, an instruction for creating an SMS message is executed.

The gyro sensor 180B may be configured to determine a motion gesture of the electronic device 100. In some embodiments, angular velocities of the electronic device 100 around the three axes (that is, the x-axis, the y-axis, and the z-axis) may be determined by using the gyro sensor 180B. The gyro sensor 180B may be used for image stabilization during photographing. For example, when a shutter is pressed, the gyro sensor 180B detects a jittering angle of the electronic device 100, calculates, based on the angle, a distance for which a lens module needs to compensate, and enables the lens to offset jittering of the electronic device 100 through reverse motion, so as to implement image stabilization. The gyro sensor 180B may be further used in a navigation scenario and a motion-controlled gaming scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a flip phone, the electronic device 100 may detect opening and closing of a flip cover based on the magnetic sensor 180D.

Further, a feature such as automatic unlocking upon opening of the flip cover is set based on a detected opening or closing state of the flip cover.

The acceleration sensor 180E may detect values of acceleration of the electronic device 100 in all directions (usually on three axes). When the electronic device 100 is static, the acceleration sensor 180E may detect magnitude and a direction of gravity. The acceleration sensor 180E may be further configured to recognize a posture of the electronic device, and is applied to applications such as switching between landscape mode and vertical mode and a pedometer.

The distance sensor 180F is configured to measure a distance. The electronic device 100 may measure a distance through infrared or laser. In some embodiments, in a photographing scenario, the electronic device 100 may measure a distance by using the distance sensor 180F, to implement quick focusing.

The optical proximity sensor 180G may include, for example, an LED and a light detector such as a photodiode. The LED may be an infrared LED. The electronic device 100 emits infrared light by using the LED. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to the ear for a call, to automatically turn off a screen to save power. The optical proximity sensor 180G may also be used in a flip cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may implement fingerprint-based unlocking, application lock access, fingerprint-based photographing, fingerprint-based call answering, or the like based on a feature of the collected fingerprint.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 reduces performance of a processor near the temperature sensor 180J, to reduce power consumption and implement thermal protection. In some other embodiments, when the temperature is lower than another threshold, the electronic device 100 heats the battery 142 to avoid abnormal shutdown of the electronic device 100 that is caused due to a low temperature. In some other embodiments, when the temperature is lower than still another threshold, the electronic device 100 boosts an output voltage of the battery 142, to avoid an abnormal shutdown caused by a low temperature.

The touch sensor 180K is also referred to as a "touch device". The touch sensor 180K may be disposed on the display 194. The touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of a touch event. Visual output related to the touch operation may be provided by using the display 194. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal cord part. The bone conduction sensor 180M may also be in contact with a human pulse, and receive a blood pressure beating signal. In some embodiments, the bone conduction sensor 180M may alternatively be disposed in the headset, to form a bone conduction headset. The audio module 170 may obtain a voice signal through parsing based on the vibration signal, of the vibration bone of the vocal cord part, obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive button input, and generate button signal input related to user settings and function control of the electronic device 100.

The motor 191 may generate a vibration prompt. The motor 191 may be used for an incoming call vibration prompt, or may be used for touch vibration feedback. For example, touch operations performed on different applications (for example, photo taking and audio playing) may be corresponding to different vibration feedback effects. The motor 191 may also correspond to different vibration feedback effects for touch operations performed in different regions of the display 194. Different application scenarios (for example, a time reminder, information receiving, an alarm clock, and a game) may also be corresponding to different vibration feedback effects. A touch vibration feedback effect may be further customized.

The indicator 192 may be an indicator light, and may be used to indicate a charging status or a power change, or may be used to indicate a message, a missed call, a notification, or the like.

The SIM card interface 195 is configured to connect to a SIM card. The SIM card may be inserted into the SIM card interface 195 or pulled out of the SIM card interface 195, to implement contact with or separation from the electronic device 100. The electronic device 100 may support one or N SIM card interfaces, and N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or different types. The SIM card interface 195 may also be compatible with different types of SIM cards. The SIM card interface 195 may also be compatible with an external memory card. The electronic device 100 interacts with a network by using a SIM card, to implement functions such as conversation and data communication. In some embodiments, the electronic device 100 uses an eSIM, namely, an embedded SIM card. The eSIM card may be embedded in the electronic device 100, and cannot be separated from the electronic device 100.

A software system of the electronic device 100 may use a layered architecture, an event-driven architecture, a micro-kernel architecture, a micro-service architecture, or a cloud architecture. In embodiments of this disclosure, an ANDROID system with a layered architecture is used as an example to describe the software structure of the electronic device 100.

Figure 2:
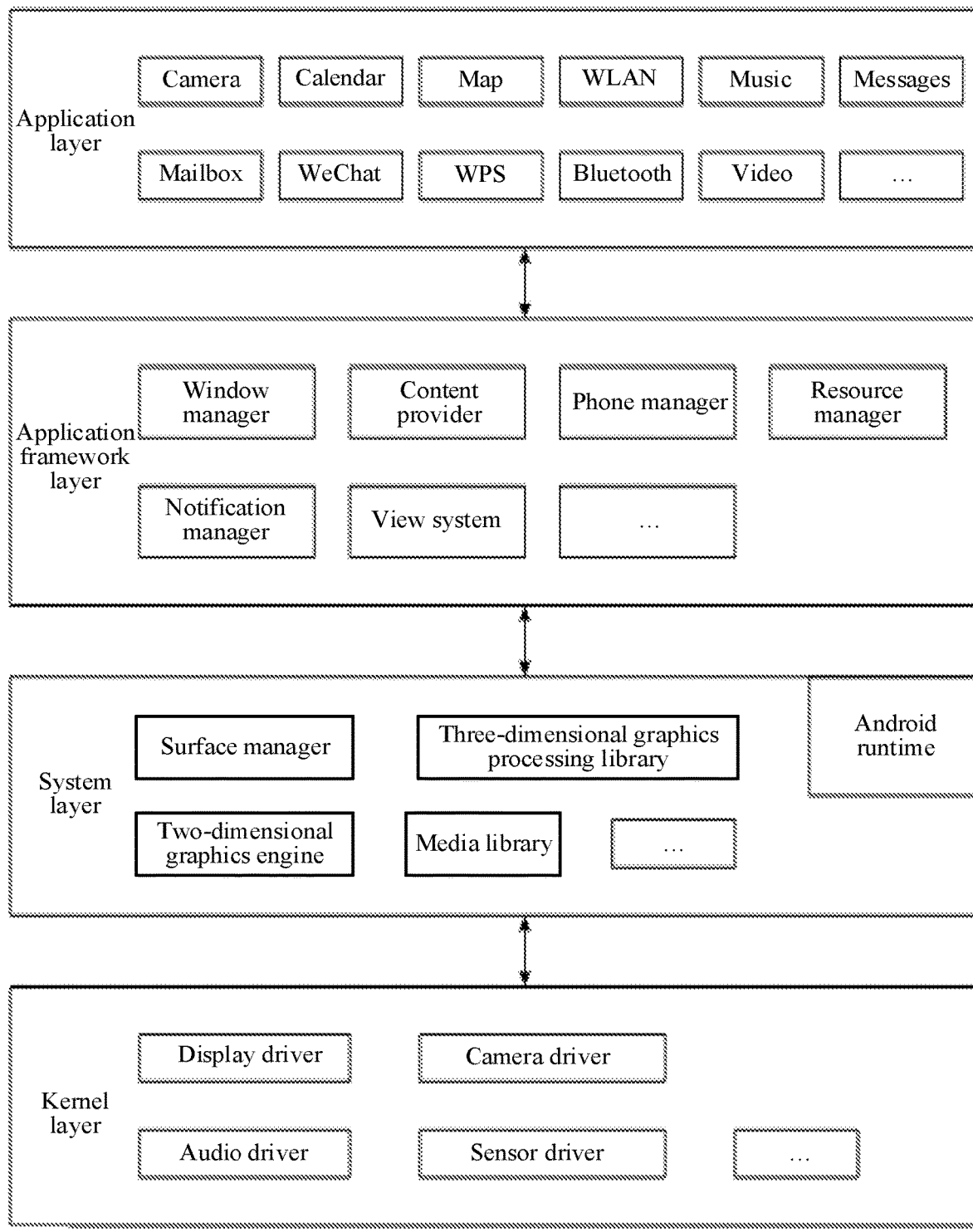
FIG. 2 is a block diagram of a software structure of an electronic device according to an embodiment of this disclosure.

FIG. 2 is a block diagram of a software structure of an electronic device according to an embodiment of this disclosure.

In a layered architecture, software is divided into several layers, and each layer has a clear role and task. The layers communicate with each other through a software interface. In some embodiments, an ANDROID system is divided into four layers: an application layer, an application framework layer, an ANDROID runtime and system library, and a kernel layer from top to bottom.

The application layer may include a series of application packages.

As shown in FIG. 2, the application packages may include applications such as Camera, Gallery, Calendar, Phone, Map, Navigation, WLAN, BLUETOOTH, Music, Video, and Messages.

The application framework layer provides an application programming interface (API) and a programming framework for applications at the application layer. The application framework layer includes some predefined functions.

As shown in FIG. 2, the application framework layer may include a window manager, a content provider, a view system, a phone manager, a resource manager, a notification manager, and the like.

The window manager is configured to manage window programs. The window manager may obtain a display size, determine whether there is a status bar, lock a screen, take a screenshot, and the like.

The content provider is configured to store and obtain data and make the data accessible to the application. The data may include videos, images, audio, calls that are made and received, browsing history and bookmarks, a phone book, and the like.

The view system includes visual controls, such as a text display control and a picture display control. The view system may be configured to construct an application. A display interface may include one or more views. For example, a display interface including an SMS notification icon may include a text display view and a picture display view.

The phone manager is configured to provide a communication function of the electronic device, for example, call status management (including accepting and declining).

The resource manager provides various resources for the application, such as a localized string, an icon, a picture, a layout file, and a video file.

The notification manager enables the application to display notification information in a status bar, and may be configured to transfer a message of a notification type. The information may automatically disappear after a short stay without user interaction. For example, the notification manager is configured to notify a download completion, a message reminder, and the like. The notification manager may alternatively be a notification that appears in a form of a graph or a scroll bar text in a status bar at the top of the system, for example, a notification of an application running in the background, or may be a notification that appears in a form of a dialog window on a screen. For example, the status bar shows text information, a prompt tone is made, the electronic device vibrates, and an indicator flickers.

The ANDROID runtime includes a kernel library and a virtual machine. The ANDROID runtime is responsible for scheduling and management of the ANDROID system.

The kernel library includes two parts: a function that needs to be invoked by using the Java language, and a kernel library of ANDROID.

The application layer and the application framework layer run in the virtual machine. The virtual machine executes a binary file of a Java file at the application layer and the application framework layer. The virtual machine is configured to perform functions such as object lifecycle management, stack management, thread management, security and abnormity management, and garbage collection.

The system library may include a plurality of function modules, for example, a surface manager, a media library, a three-dimensional (3D) graphics processing library (for example, OpenGL ES), and a two-dimensional (2D) graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, such as MPEG-4, H.264, MPEG-1 Audio Layer III or MPEG-2 Audio Layer III (MP3), Advanced Audio Coding (AAC), Adaptive Multi-Rate (AMR), Joint Photographic Experts Group (JPEG), and Portable Network Graphics (PNG).

The 3D graphics processing library is configured to implement 3D graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the electronic device 100 with reference to a photographing scenario.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap touch operation, and a control corresponding to the single-tap operation is a control of a camera application icon. The camera application invokes an interface of the application framework layer to enable a camera application, then enables a camera driver by invoking the kernel layer, and captures a static image or a video through the camera 193.

With continuous development of multimedia technologies, display technologies of electronic devices develop toward a high resolution and a high refresh rate. When displaying display content with a high resolution and a high refresh rate, for example, displaying a video, a high-definition static image, and a dynamic image, an electronic device needs to transmit display data in a high-speed transmission mode, to meet a requirement for a large data amount and high-speed transmission of the display content. When sending display data with a relatively large data amount to a display module, a processor in the electronic device usually needs to divide a video image frame or a static image into a plurality of data packets for sending. However, energy consumption is high in the high-speed transmission mode. To reduce resource consumption, the electronic device switches from the high-speed transmission mode to a low-power-consumption mode in an interval period of sending the foregoing data packets, and disables, in the low-power-consumption mode, data receiving at a physical layer and a circuit for parsing received data, to reduce power consumption of the electronic device. In addition, to eliminate a ghost image, there is a transmission gap period for the electronic device between a transmission end of a frame of video data and a transmission start of a next frame of video data. The transmission gap period is a vertical blanking period, and may also be referred to as frame blanking. Correspondingly, there is a transmission gap period between a transmission end of a line of video data and a transmission start of a next line of video data. The transmission gap period is a horizontal blanking period, and may also be referred to as line blanking. Because data transmission does not need to be performed between the processor and the display module in the two transmission gap periods, the electronic device may switch to the low-power-consumption mode in the transmission gap periods (the vertical blanking period and the horizontal blanking period), to reduce energy consumption of the electronic device.

Figure 3:
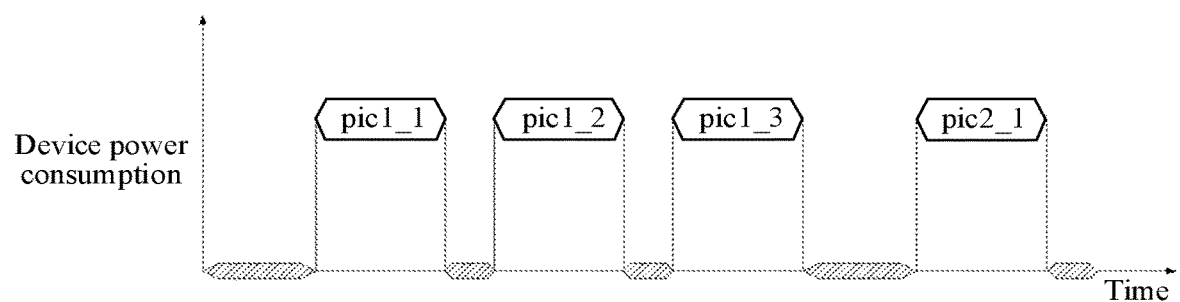
FIG. 3 is a schematic diagram of energy consumption in a case that a processor in an electronic device sends display data to a display module by using an existing display synchronization technology.

For example, FIG. 3 is a schematic diagram of energy consumption in a case that a processor in an electronic device sends display data to a display module by using an existing display synchronization technology. As shown in FIG. 3, when the electronic device displays a video or a dynamic image, the processor of the electronic device separately sends a plurality of frames of images to the display module. For example, pic1_X indicates the first frame of image, and pic2_X indicates the second frame of image. In addition, each frame of image is divided into a plurality of image data packets. Each image data packet includes at least one line of image data. For example, pic1_1 indicates the first image data packet of the first frame of image, and pic1_2 indicates the second image data packet of the second frame of image. When the processor in the electronic device sends the image data packets to the display module, the electronic device is in a high-speed transmission mode, and in this case, energy consumption is high. In a transmission gap period of the data packets, for example, a transmission gap period between frames of images and a transmission gap period between data packets in a same frame of image, the electronic device switches to a low-power-consumption mode, to avoid that the electronic device is in the high-speed transmission mode for a long time and energy consumption of the device increases.

In a process in which the electronic device displays display content such as a video, to ensure accurate display of the display content and avoid an abnormal display phenomenon such as screen splitting or tearing of a picture, the processor and the display module need to complete synchronization of the display content, to ensure that data transmission on a transmitting end (that is, a processor side) and a receiving end (that is, a display module side) is consistent. For example, if the display content is a video image, it is ensured that each frame of video image and image data in each line in a same frame of video image are not disordered. Therefore, to ensure that the display content sent by the processor is consistent with display content displayed by the display module in terms of phase and frequency, before each frame of video image is transmitted, the processor and the display module need to perform communication based on a vertical synchronization signal, and before a line of video data is transmitted, the processor and the display module need to perform communication based on a horizontal synchronization signal. Communication based on the vertical synchronization signal and the horizontal synchronization signal is usually completed in the foregoing transmission gap period. For example, the vertical synchronization signal is transmitted in the vertical blanking period, and the horizontal synchronization signal is transmitted in the horizontal blanking period. A serial display interface commonly used by the electronic device, for example, the foregoing MIPI-DSI, may transmit a synchronization signal for display content in the following two transmission manners.

Figure 4:
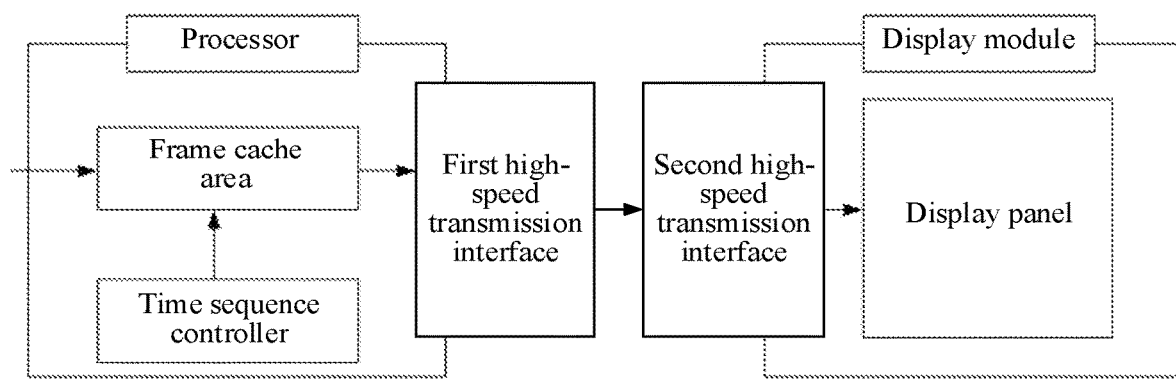
FIG. 4 is a schematic diagram of a structure of a data path between a processor and a display device in a manner of transmitting a video synchronization signal based on a synchronization short packet.

Manner 1: is a manner of transmitting a video synchronization signal based on a synchronization short packet. In this manner, before each video data packet is transmitted (for example, in a vertical blanking period or a horizontal blanking period), a processor needs to send an additional synchronization short packet to a display module. Video data transmission is used as an example for description. For example, FIG. 4 is a schematic diagram of a structure of a data path between a processor and a display device in a manner of transmitting a video synchronization signal based on a synchronization short packet. As shown in FIG. 4, the processor includes three components: a time sequence controller, a frame cache area, and a first high-speed transmission interface. The frame cache area is configured to store all image data packets of a video image that need to be sent, and the time sequence controller is configured to sequentially send, based on a preset time sequence, the image data packets and synchronization short packets associated with the image data packets, to perform video image synchronization between the processor and the display module. The display module includes two components: a second high-speed transmission interface and a display panel. A data path exists between the first high-speed transmission interface and the second high-speed transmission interface. The processor may send the image data packets and the synchronization short packets to the display module through the data path. A video data transmission process may be as follows. The processor first caches to-be-displayed video data in the local frame cache area. The frame cache area provides, at a specific time point under control of the time sequence controller, the video data for a protocol layer of the processor for packing, to obtain a plurality of image data packets (which may be encapsulated into data long packets) and synchronization short packets corresponding to the image data packets. The packed image data packets and synchronization short packets corresponding to the image data packets are sent to the display module through the data path between the first high-speed transmission interface and the second high-speed transmission interface. Finally, a protocol layer of the display module parses the image data packets and the corresponding synchronization short packets to obtain the video data. After obtaining the video data, the display panel of the display module displays an image.

Figure 5:
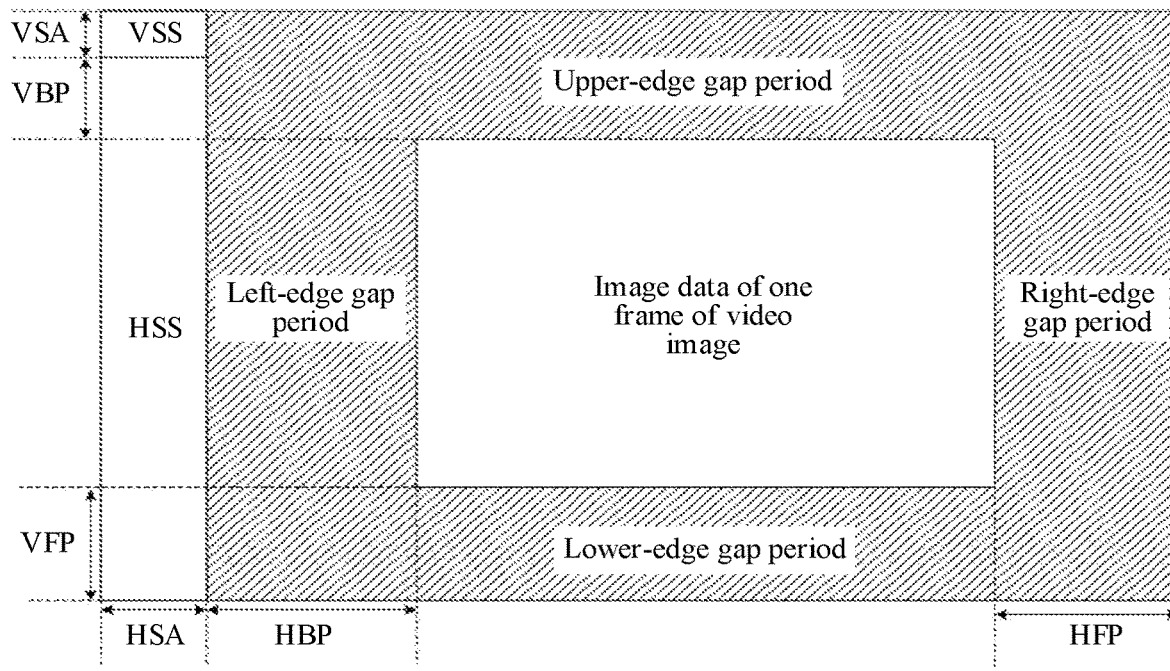
FIG. 5 is a schematic diagram of a structure in which an image data packet and a synchronization short packet that are obtained by dividing each frame of video image are transmitted based on a synchronization short packet manner.

To clearly describe a correspondence between image data packets and synchronization short packets, FIG. 5 is a schematic diagram of a structure in which an image data packet and a synchronization short packet that are obtained by dividing each frame of video image are transmitted based on a synchronization short packet manner. As shown in FIG. 5, before the first image data packet of each frame of video image is sent, a vertical synchronization short packet, that is, a vertical synchronization start (VSS), is sent to indicate that a frame of video image starts to be sent, to distinguish from a previous frame of video image. Optionally, a data type field in the VSS short packet may be set to a first bit value, for example, 0x01, to indicate a dedicated short packet of a synchronization signal in a vertical direction. After receiving the VSS short packet, the display module may restore the synchronization signal in the vertical direction. Then, before sending each image data packet of the frame of video image, the processor first sends a horizontal synchronization short packet having a synchronization signal in a horizontal direction, that is, a horizontal synchronization start (HSS), to indicate that an operation of sending a new line of video image data starts, to distinguish from a previous line of video image data. Optionally, a data type field in the HSS short packet may be set to a second bit value, for example, 0x21, to indicate a dedicated short packet of the synchronization signal in the horizontal direction. After receiving the HSS short packet, the display module may restore the synchronization signal in the horizontal direction. The processor may determine a sending time sequence according to a refresh rate requirement of the display module, and send the VSS short packet, the HSS short packet, and each image data packet of the video image in the preset time sequence by using the time sequence controller, to complete image display on the display panel of the display module. To reduce power consumption in the system, in a time period in which no data transmission needs to be performed (that is, another time period other than a time period for transmitting the synchronization short packet and the image data packet), the processor ends high-speed transmission, and drives the data path to a low-power-consumption mode (no data transmission). It can be learned from FIG. 5 that the low-power-consumption mode includes four transmission gap periods, which are respectively an upper-edge gap period with respect to a previous frame of video image, a lower-edge gap period with respect to a next frame of video image, a left-edge gap period with respect to a previous line of video image data, and a right-edge gap period with respect to a next line of video image data. Because an HSS short packet needs to be sent in the left/right-edge gap period, the left/right-edge gap period is separated (for example, a horizontal synchronization validity period HSA in FIG. 5 exists). An actual period of the low-power-consumption mode is a horizontal back period (HBP) and a horizontal front period (HFP) in FIG. 5. In the upper/lower-edge gap period, a part of the HSS short packet and a VSS short packet need to be sent, and the upper/lower-edge gap period is separated (for example, a vertical synchronization validity period VSA and a vertical synchronization validity period VBP in FIG. 5 exists). An actual period of the low-power-consumption mode is a vertical front period VFP and a vertical back period VBP in FIG. 5. The electronic device cannot be continuously in the low-power-consumption mode in a preset slot.

In this manner, before each video data packet is transmitted (for example, in a vertical blanking period or a horizontal blanking period), the processor needs to send an additional synchronization short packet to the display module. Because the electronic device is in the low-power-consumption mode when the synchronization short packet is sent, to complete sending of the synchronization short packet, the data path between the processor and the display module needs to be switched to a high-speed mode. Consequently, the low-power-consumption mode in the blanking period is separated, and cannot be maintained continuously. This increases system power consumption.

Manner 2: is a transmission manner in which signal synchronization is implemented based on a dedicated signal line or a display module control bus. In this manner, to complete time synchronization of video data between the processor and the display module, the display module may perform a time sequence control operation on a display module side, for example, display image data of each frame of video image in a preset time sequence, determine a start moment and an end moment of a vertical blanking period or another blanking period, and feed back a corresponding generated synchronization signal to the processor. In this transmission manner, the display module has a time sequence controller and a second frame cache area for display refresh. The processor may first cache displayed video data in the local first frame cache area, and after receiving a synchronization signal through the dedicated signal line or the display module control bus, extract the video data in the first frame cache area and provide the video data for a protocol layer of the processor for packing to obtain an image data packet of each frame of video image. The packed image data packet is sent to the display module through the bus. After the image data packet is unpacked by a protocol layer of the display module, pixel data is obtained. The pixel data is first stored in the second frame cache area of the display module, extracted in a specific time sequence under control of the time sequence controller, and then provided for the display panel of the display module for display.

In a command mode, a host can send image data only after receiving a TE synchronization signal sent by the display device. A refresh time sequence is controlled by the display device.

The foregoing transmission manner may be implemented in the following two manners.

Figure 6:
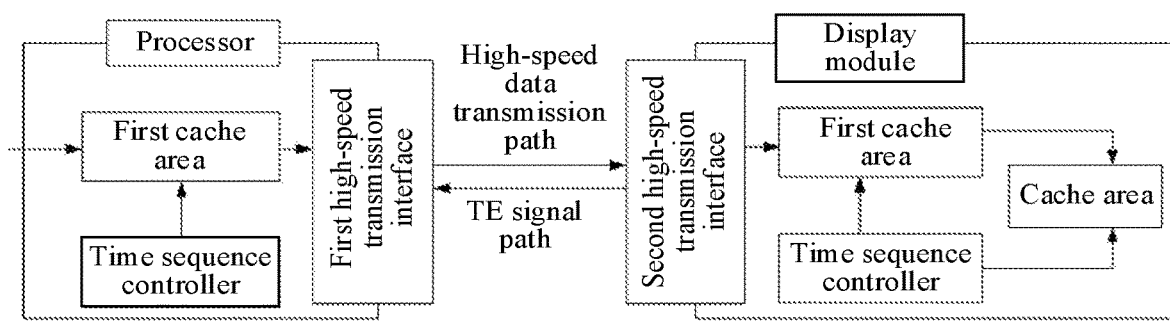
FIG. 6 is a schematic diagram of a structure of a data path between a processor and a display device in a case that a synchronization signal is transmitted by using a dedicated signal line.

In a first manner, a dedicated signal line TE for transmitting a synchronization signal is configured between the processor and the display module, the time sequence controller in the display module notifies the processor of a generated synchronization signal by using the dedicated signal line TE, and the processor may send each frame of video image and each image data packet of each frame of video image in a preset time sequence based on the received synchronization signal. For example, FIG. 6 is a schematic diagram of a structure of a data path between a processor and a display device in a case that a synchronization signal is transmitted by using a dedicated signal line. As shown in FIG. 6, the processor includes two components: a first cache area and a first high-speed transmission interface. The first cache area is configured to store each image data packet of a video image that needs to be sent. The display module includes four components: a time sequence controller, a second cache area, a second high-speed transmission interface, and a display panel. The second cache area is configured to store image data packets of a video image sent by the processor. The time sequence controller is configured to sequentially send the image data packets and synchronization short packets associated with the image data packets based on a preset time sequence, to perform video image synchronization between the processor and the display module. Two data paths exist between the first high-speed transmission interface and the second high-speed transmission interface, which are respectively a high-speed data transmission path and a signal path of a dedicated signal line TE. The processor may send the image data packets to the display module through the high-speed data transmission path, and the display module may feed back the synchronization short packets to the processor through the signal path.

Figure 7:
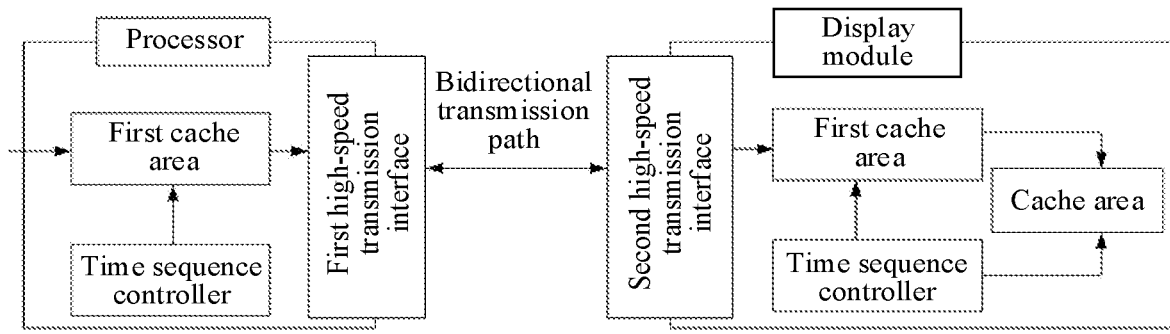
FIG. 7 is a schematic diagram of a structure of a data path between a processor and a display device in a case that a synchronization signal is transmitted by using a data path having a bidirectional communication capability.

In a second manner, a data path between the processor and the display module has a bidirectional communication capability. To be specific, the processor may send video data to the display module through the data path, and the display module may feed back a synchronization signal to the processor through the data path. The processor may query a synchronization signal from the display module, for example, send a synchronization query request to the display module. In this case, the processor may transfer sending permission of the data path to the display module. The display module sends a synchronization short packet to the processor in response to the synchronization query request sent by the processor, and returns the sending permission of the data path to the processor after the sending is completed. For example, FIG. 7 is a schematic diagram of a structure of a data path between a processor and a display module in a case that a synchronization signal is transmitted by using a data path having a bidirectional communication capability. As shown in FIG. 7, a difference from the structure shown in FIG. 6 is that the processor and the display module are connected through one data line, and a synchronization signal is transmitted by exchanging sending permission.

In the transmission manner in which signal synchronization is implemented based on the dedicated signal line or the display module control bus, synchronization signal transmission needs to be completed by sending a synchronization signal to the processor by the display module. Therefore, the display module needs to have a synchronization signal sending capability. If the synchronization signal is transmitted by using an additional dedicated signal line, not only complexity between devices in the electronic device is increased, but also an area of circuit cabling is increased. If a data path for bidirectional transmission is used, and sending permission of the data path is controlled by the display module to send the synchronization signal, a physical layer of the display module needs to have a data sending capability. This increases system complexity. In addition, the display module is configured with the second frame cache area, and time sequence control is completed by the display module. Therefore, the second frame cache area needs to have a cache capacity for at least one frame of video image. This increases costs of the display module and increases costs of the entire electronic device.

In the first manner, display synchronization is implemented based on an additional synchronization short packet. Because a vertical synchronization short packet and a horizontal synchronization short packet are transmitted between data long packets, the data path needs to enter a high-speed mode to receive the short packets, and then exit the high-speed mode. In this case, the blanking period is separated, and device energy consumption is increased. In the second manner, a synchronization signal is transmitted based on a dedicated line or a bidirectional data path. Therefore, device complexity and device costs are increased, and energy consumption reduction and device cabling complexity reduction cannot be considered at the same time.

Embodiment 1

Figure 8A:
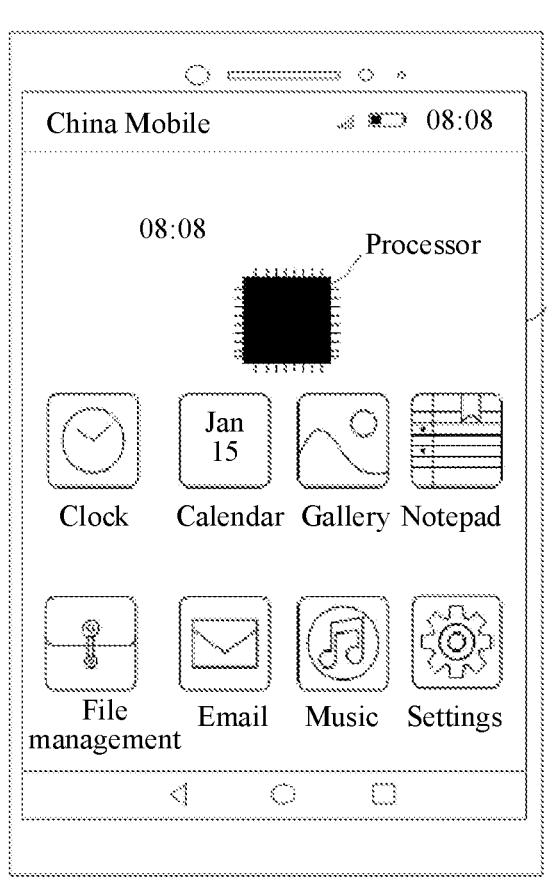
FIG. 8A and FIG. 8B are schematic diagrams of a connection between a processor and a display module of an electronic device according to an embodiment of this disclosure.
Figure 8B:
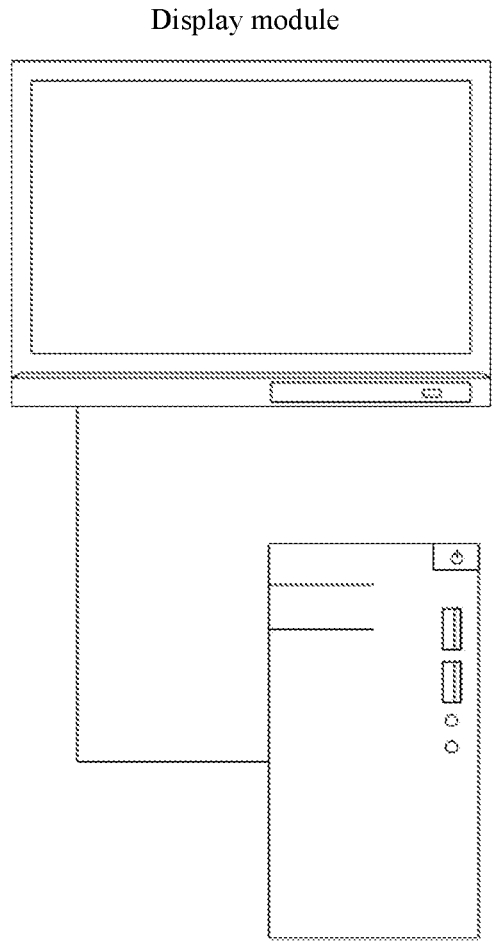
Figure 9:
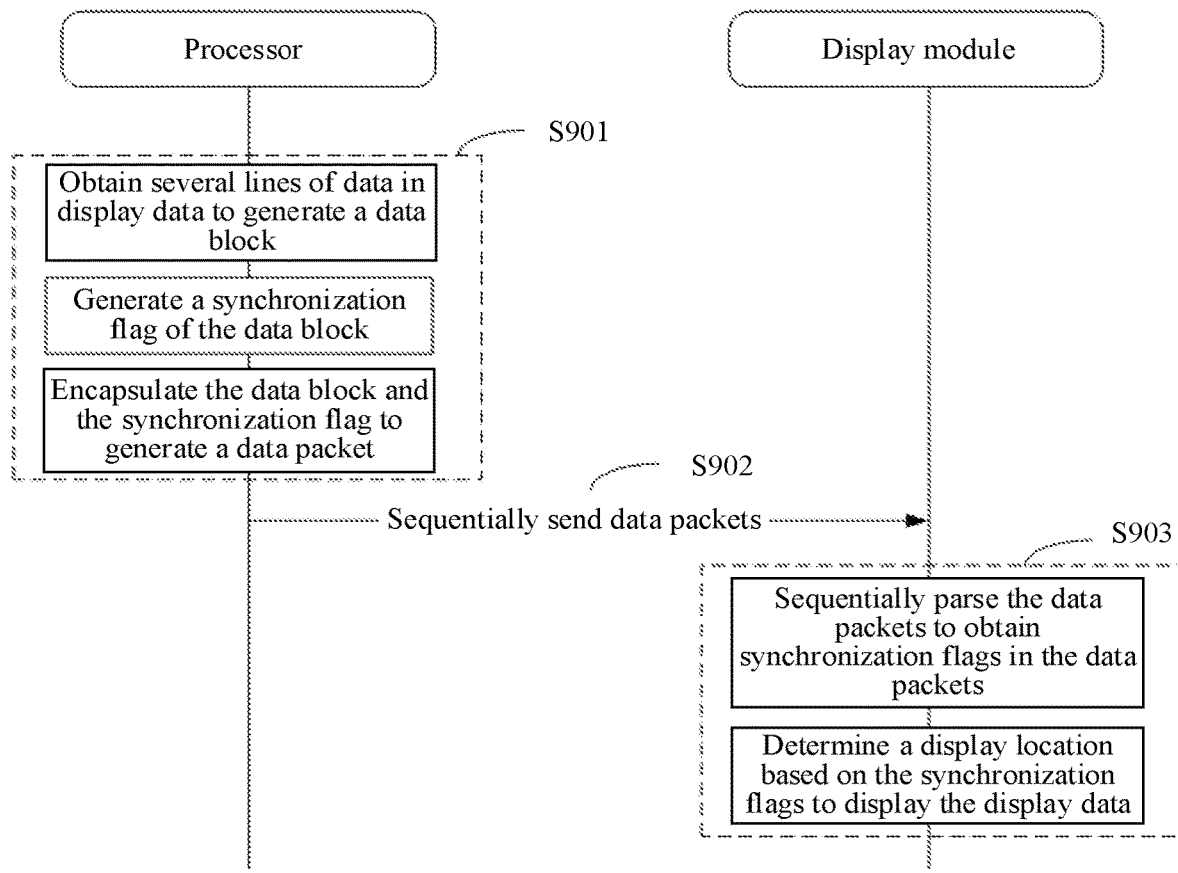
FIG. 9 is a flowchart of implementation of a display synchronization method according to an embodiment of this disclosure.

To deal with the defect of the foregoing display synchronization technology, this disclosure provides a display synchronization method. Details are provided below. The display synchronization method is performed by an electronic device. The electronic device may be a smartphone, a tablet computer, a computer, a smart game console, or any device configured with a display module. The electronic device has a built-in processor, and a built-in or external display module. The display synchronization method is used to implement display synchronization between the processor and the display module of the electronic device. For example, FIGS. 8A and 8B are schematic diagrams of a connection between a processor and a display module of an electronic device according to an embodiment of this disclosure. As shown in FIG. 8A, the display module may be a display module built in the electronic device. In this case, the processor may be connected to the display module through a serial interface on a circuit board installed in the processor. As shown in FIG. 8B, the display module may be a display module externally connected to the electronic device, and the display module may be connected to a serial interface of the electronic device, and establish a communication link to the processor by using a data bus connected to the serial interface. The serial interface between the processor and the display module may be a MIPI-DSI interface. FIG. 9 is a flowchart of implementation of a display synchronization method according to an embodiment of this disclosure. Details are as follows.

In S901, the processor obtains several lines of data in to-be-displayed display data to generate a data block, the processor generates a synchronization flag corresponding to the data block, and the processor encapsulates the data block and the synchronization flag corresponding to the data block to obtain a data packet.

In this embodiment, the electronic device has a built-in memory, and the display data may be stored in the memory of the electronic device. The display data includes a static image file, a dynamic image file, a video file, or the like. Optionally, in addition to a file pre-stored in the memory of the electronic device, files that can be displayed may further include preview picture data captured in real time by using a camera module and live video data received from a communication peer end. For the foregoing display operation, the electronic device may cache the captured preview picture data and/or the live video data in the memory of the electronic device. The memory of the electronic device may include two types of storage media: memory and a hard disk. The memory may be configured to store data used in a running process of the processor. Compared with the hard disk, the memory has a higher read/write speed but smaller storage space. Therefore, the memory is usually configured to store data that requires high-speed storage. For example, in some embodiments, the processor may store preview content and received live video data in the memory. Optionally, the electronic device may store the preview picture data and/or the live video data in a temporary file, and update the temporary file at a preset frequency (that is, replace existing display data in the temporary file with newly captured preview picture data and/or newly received live video data). If the electronic device receives a shooting operation or a preview end operation of a user, the electronic device may delete the temporary file used to store the preview picture data, or remove the preview picture data from occupied storage space in a cache area. Similarly, if the electronic device receives a live broadcast disabling operation of the user or receives a live broadcast end instruction fed back by the communication peer end, the electronic device may delete the temporary file used to store the live video data, or remove the live video data from occupied storage space in a cache area. The processor of the electronic device may obtain, from the memory or the cache area, data that can be displayed, that is, the foregoing display data.

Figure 10A:
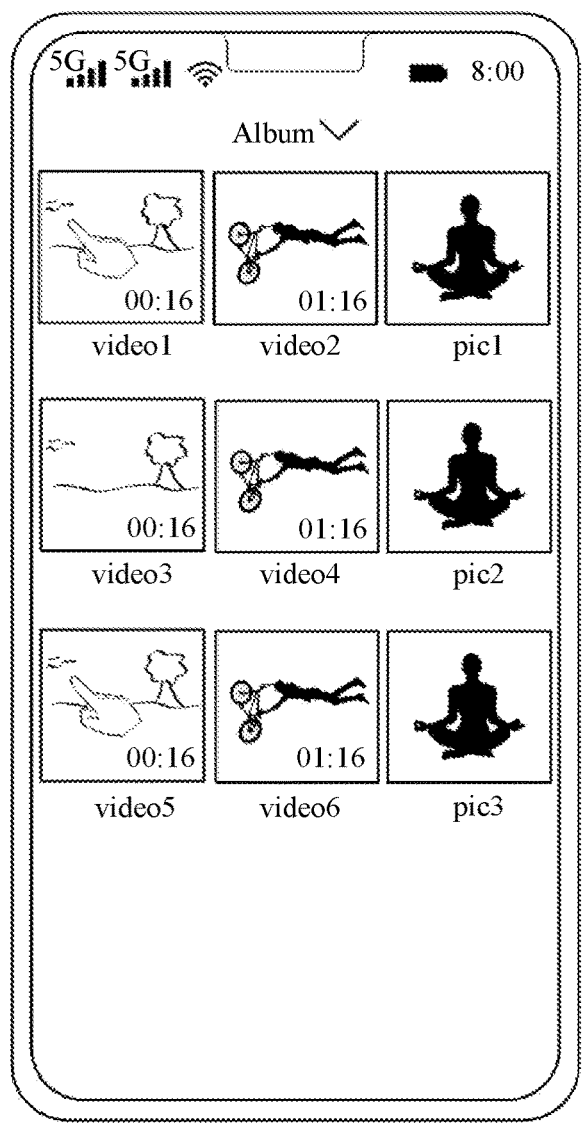
FIG. 10A and FIG. 10B are schematic diagrams of triggering a display operation according to an embodiment of this disclosure.
Figure 10B:
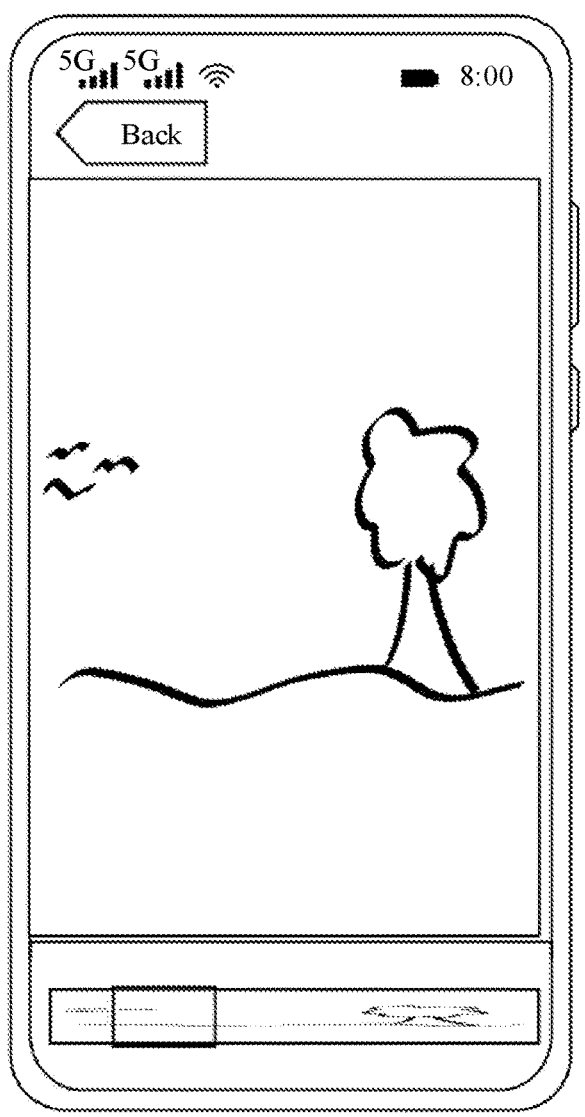

In a possible implementation, before S901, the display synchronization method may further include the following. The processor determines, in response to a display operation initiated by the user, display data associated with the display operation. For example, FIGS. 10A and 10B are schematic diagrams of triggering a display operation according to an embodiment of this disclosure. As shown in FIG. 10A, the electronic device may display preview icons of a plurality of candidate files by using the display module, for example, video1, video2, and pic1. The electronic device may receive a selection operation initiated by the user, for example, receive a tap operation performed by the user for video1. In this case, the electronic device identifies that the user initiates a display operation for video1, identifies a file corresponding to video1 as display data that needs to be displayed, and displays video1 by using the display module, as shown in FIG. 10B.

Figure 11A:
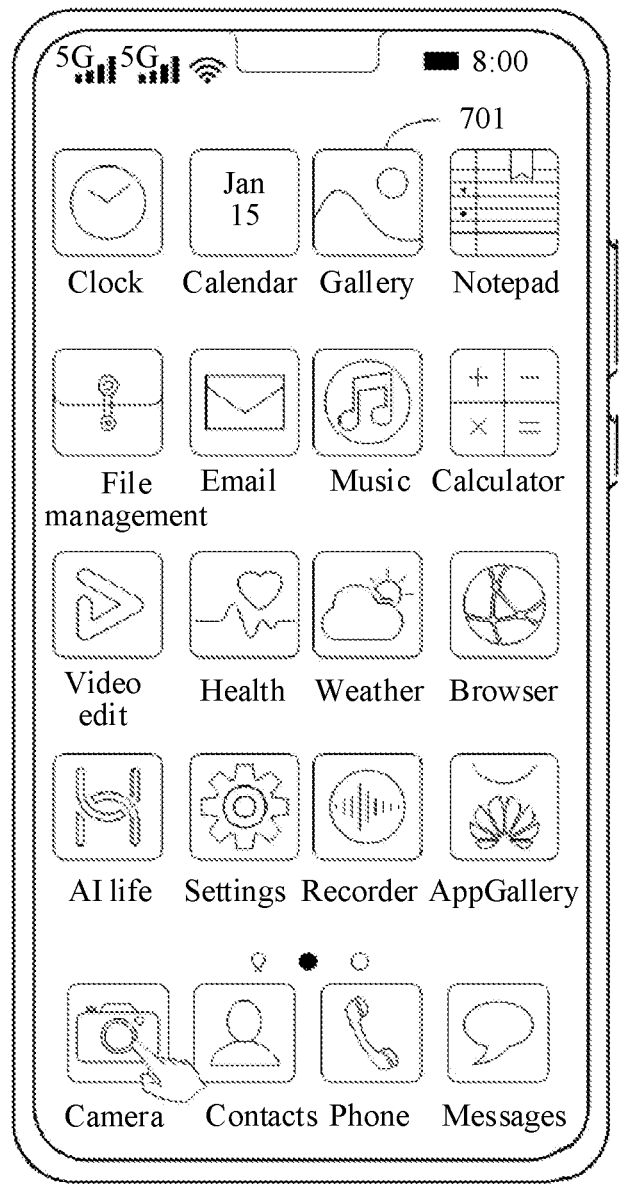
FIG. 11A and FIG. 11B are a schematic diagram of triggering a preview operation according to an embodiment of this disclosure.
Figure 11B:
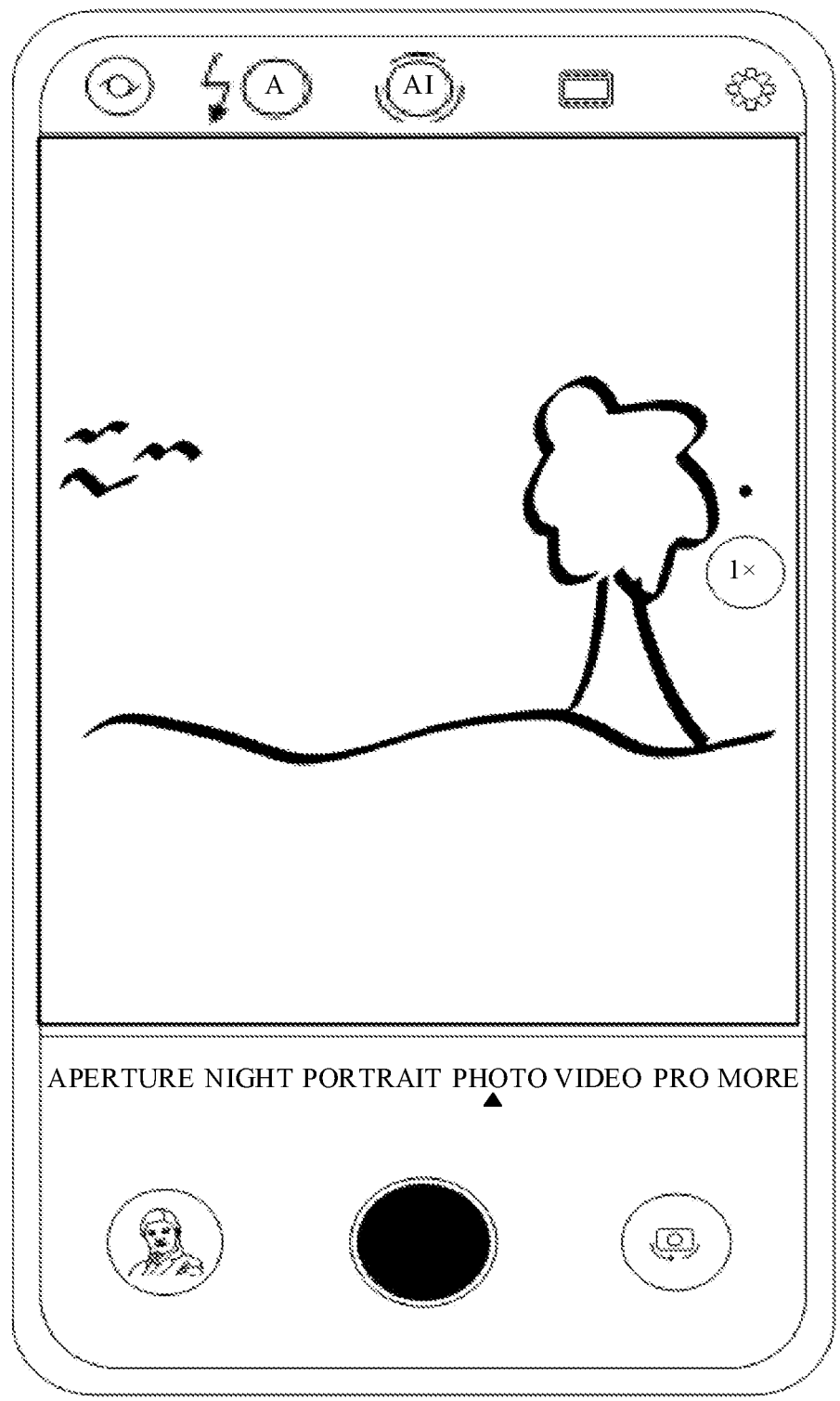

In a possible implementation, before S901, the display synchronization method further includes the following. In response to a preview operation initiated by the user, the processor uses preview data captured by a camera module as display data. For example, FIG. 11A and FIG. 11B are a schematic diagram of triggering a preview operation according to an embodiment of this disclosure. As shown in FIG. 11A, the electronic device may display a home screen by using the display module, and the home screen includes icons of a plurality of applications, for example, a "Camera" application. If the electronic device receives a tap operation performed by the user on the "Camera" application, a shooting preview interface is generated, as shown in FIG. 11B. The electronic device may use preview data captured by the camera module in real time as display data that needs to be displayed. The operation of tapping the "Camera" application on the electronic device by the user is the foregoing preview operation.

Figure 12:
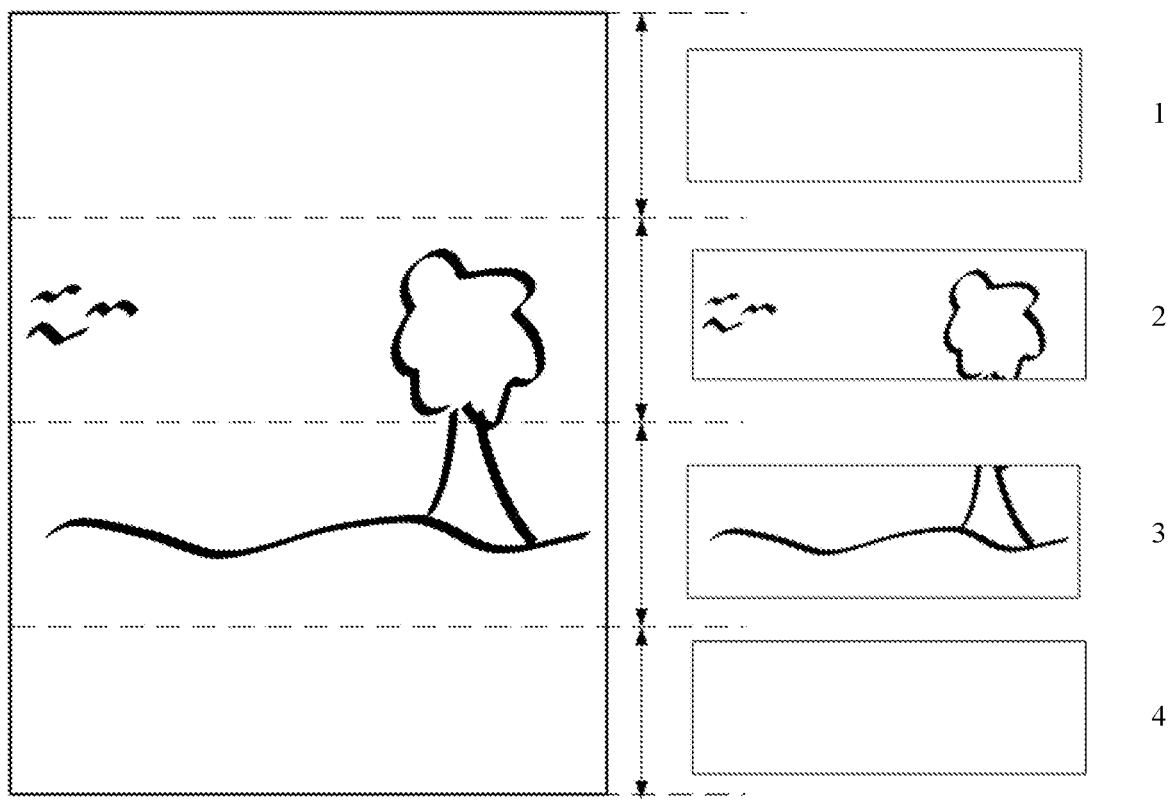
FIG. 12 is a schematic diagram of reading image data according to an embodiment of this disclosure.

In this embodiment, the display data may include at least one frame of image. If the display data is video data, the display data may include a plurality of frames of video images. In a process of displaying the display data by the electronic device, the processor may obtain at least one frame of image from the display data, and read some data in the image to generate a corresponding data block. Therefore, in an overall display process of an entire image, the processor performs a plurality of read operations, and a corresponding data block is generated in each read operation. Therefore, when the processor sends the image to the display module, the image is divided into a plurality of data blocks for sending. For example, FIG. 12 is a schematic diagram of reading image data according to an embodiment of this disclosure. As shown in FIG. 12, each data block may be several lines of data in one frame of image. A specific quantity of lines of data read by the processor may be determined by the processor. In some embodiments, the quantity of lines may be determined according to a memory capacity of a memory of the processor or an amount of data that can be encapsulated in a data packet. For example, the processor and the display module agree that each data block includes a maximum of N lines of data. For example, a value of N is 5. In this case, the processor reads five lines of data in one frame of image each time, and generates one data block. Therefore, after a plurality of read operations, one frame of image may be divided into a plurality of data blocks. Because the read operation of the processor is performed by lines, data in a same line is definitely classified into a same data block.

In a possible implementation, the electronic device may configure a corresponding display number for each data block, where the display number is determined based on a frame number of image data to which the data block belongs and a location of the data block in the image data. A smaller frame number of image data indicates an earlier display number of a corresponding data block, and the display number is used to determine a sending sequence and a display sequence of pieces of image data. If a refresh direction of a display panel in the display module is from top to bottom, in same image data, a display number of an upper data block is less than a display number of a lower data block. As shown in FIG. 12, a display number of an uppermost data block is 1, and a display number of a lowermost data block is 4. Correspondingly, if the refresh direction of the display panel in the display module is from bottom to top, in same image data, a display number of an upper data block is greater than a display number of a lower data block.

In this embodiment, the electronic device configures a corresponding synchronization flag for each data block obtained through division, to perform display synchronization between the processor and the display module. There may be at least three types of synchronization flags: a start of frame flag, an end of frame flag, and a start of line flag.

In a possible implementation, the synchronization flag includes three flags: a start of frame (SOF) flag, a start of line (SOL) flag, and an end of frame (EOF) flag. If the data block is a first displayed data block of a frame of image data, SOF may be configured as a valid bit value. For example, SOF is set to 1 or 0, or may be set to another preset value. If the data block is a last displayed data block of a frame of image data, EOF may be configured as a valid bit value. For example, EOF is set to 1 or 0, or may be set to another preset value. SOF and EOF are configured, to distinguish between a previous frame of image data and a next frame of image data, to implement vertical synchronization of a display process. For another data block other than the first data block and the last data block of a frame of image data, SOL may be configured as a valid bit value, to indicate the display device to perform line-feed display, that is, to implement horizontal synchronization of a display process. For example, Table 1 is a schematic diagram of a format of a synchronization flag according to an embodiment of this disclosure. As shown in Table 1, the synchronization flag includes 3 bits, each bit may be used to represent one flag, and the bits sequentially represent SOF, SOL, and EOF. It should be noted that, for the first data block of a frame of image data, SOF is configured as a valid bit value, and the data block is definitely used to indicate start of a line of image data. In this case, SOL may also be configured as a valid bit value, for example, 1, or certainly may be configured as an invalid bit value, for example, 0. Correspondingly, for the last data block of a frame of image data, EOF is configured as a valid bit value, and the data block is definitely used to indicate start of a line of image data. In this case, SOL may also be configured as a valid bit value, for example, 1, or may be configured as an invalid bit value, for example, 0.

TABLE 1

| SOF | SOL | EOL |
| --- | --- | --- |
| 1/0 | 1/0 | 1/0 |

In a possible implementation, the synchronization flag may have 2 bits. A 2-bit synchronization flag can be configured as a maximum of four types of flags. Therefore, the processor may allocate the four types of flags to the start of frame flag, the start of line flag, and the end of frame flag. For example, the start of frame flag is configured as 01, the end of frame flag is configured as 10, and the start of line flag is configured as 11. A specific meaning of the synchronization flag is determined by identifying specific bit values of the two bits of the synchronization flag. Therefore, a quantity of bits occupied by the synchronization flag is reduced.

In this embodiment, the processor may encapsulate a data block obtained by dividing each frame of image data and a synchronization flag associated with the data block, to generate a data packet having a display synchronization function. The synchronization flag may be configured in a header of the data packet, or may be configured in a tail of the data packet, or may be configured in any pre-agreed field in the data packet.

In a possible implementation, the synchronization flag may be configured in a corresponding field added to a packet header of the data packet, to implement display synchronization. For example, the synchronization flag may be configured in a packet header of a long packet.

Optionally, the data packet is sent to the display module by using a MIPI-DSI interface. In this case, the packet header of the data packet may be in the following four formats.

Figure 13B:
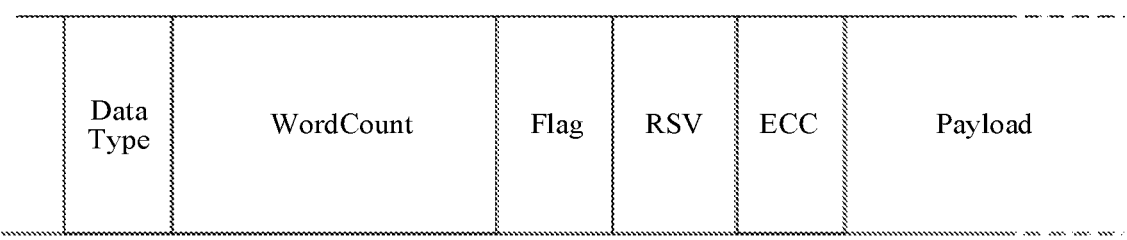

Format 1: A synchronization flag field is added between a 16-bit payload count and an 8-bit error-correcting code in a packet header of a data long packet. For example, FIGS. 13A and 13B are diagrams of comparison between a packet header format of a data long packet in a DSI protocol and a packet header format of a data packet newly defined in this disclosure. As shown in FIG. 13A, the packet header format is a packet header format of a data long packet in the existing DSI protocol, and a packet header of the data long packet includes three parts: an 8-bit data identifier (Data ID) field (a 2-bit virtual channel identifier and a 6-bit data type), a 16-bit payload count (WordCount) field, and an 8-bit ECC field. The WordCount field may be used to indicate a data length of a data amount of display data, and display data that actually needs to be displayed, that is, a payload field, may be stored after the packet header of the data long packet. As shown in FIG. 13B, the data packet newly defined in this disclosure may include a data type (DataType) field, a WordCount field, a synchronization field, and an ECC field. The DataType field is used to determine a data type corresponding to a data block, for example, an image type or a video frame type, and different data types may be represented by using different values. The synchronization field is used to store the foregoing synchronization flag. In a possible implementation, the synchronization field may be located between the WordCount field and the ECC field. The synchronization field includes two parts: a synchronization flag field and a reserved (RSV) field. The synchronization flag field may be 3 bits, which are respectively SOF, SOL, and EOL. In this case, a length of the RSV field may be 14 bits, and the ECC field is correspondingly adjusted to 7 bits. Certainly, the synchronization flag field may alternatively be 2 bits. In this case, the RSV field may be 14 bits, and the ECC field is correspondingly adjusted to 8 bits. Optionally, the newly defined data packet includes a synchronization flag, and a synchronization signal may not need to be transmitted by using a dedicated signal line or a bidirectional bus. Therefore, a transmission virtual channel identifier in the newly defined data packet may be omitted, and all the 8 bits may be used to indicate the DataType. Compared with the data long packet in the existing DSI protocol, the data packet newly defined in this disclosure includes the synchronization flag field, used to store the synchronization flag. In a process of sending the data packet, display synchronization between the processor and the display module can be implemented, and no additional data short packet sending operation needs to be performed. Therefore, the data packet provided in this disclosure has only one type, and a data long packet and a data short packet are unified. That is, the data packet in this disclosure does not have a long packet type or a short packet type. In a display synchronization process, an additional synchronization short packet does not need to be sent, so that separation of a blanking period is avoided, or a dedicated signal line does not need to be configured to transmit a data short packet, so that device energy consumption and device cabling complexity can be reduced, and both device energy consumption and cabling difficulty are reduced.

Figure 14:
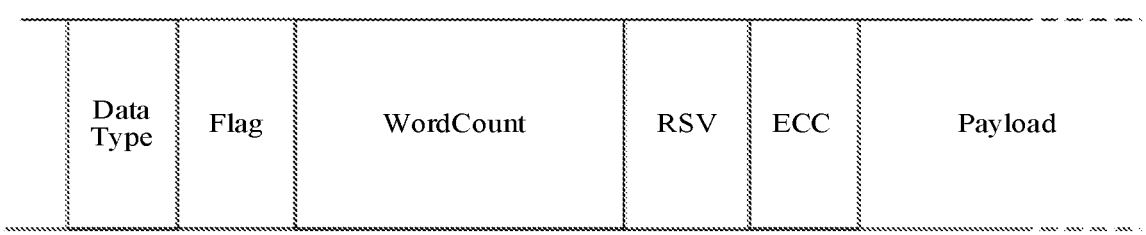
FIG. 14 is a schematic diagram of a packet header format of a newly defined data packet according to a second embodiment of this disclosure.

Format 2: A synchronization flag field may be located between a DataType field and a WordCount field in a packet header of a data packet. For example, FIG. 14 is a schematic diagram of a packet header format of a newly defined data packet according to a second embodiment of this disclosure. As shown in FIG. 14, the data packet includes the following five parts: a DataType field, a Flag field, a WordCount field, an RSV field, and an ECC field. Similarly, the Flag field may be 3 bits, or may be 2 bits. A length of another field may be adjusted according to a length of the Flag field. For details, refer to related descriptions of the foregoing format. Details are not described herein again.

Figure 15:
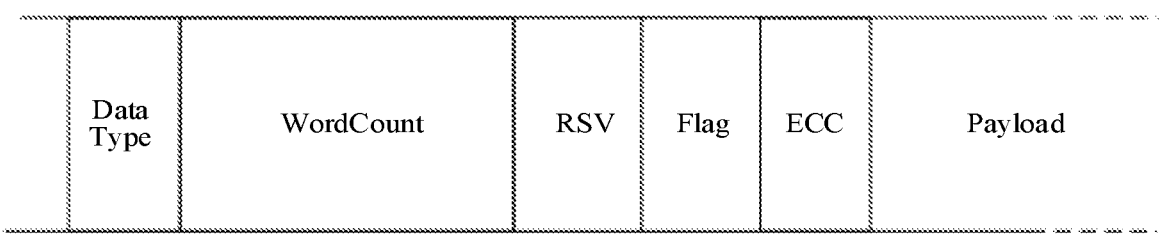
FIG. 15 is a schematic diagram of a packet header format of a newly defined data packet according to a third embodiment of this disclosure.

Format 3: A synchronization flag field may be located between an RSV field and an ECC field in a packet header of a data packet. For example, FIG. 15 is a schematic diagram of a packet header format of a newly defined data packet according to a third embodiment of this disclosure. As shown in FIG. 15, a reserved field is added to a packet header of the data packet in an original format. The reserved field is configured between a WordCount field and an ECC field, and is reserved for function extension. A synchronization flag field may be configured between the RSV field and the ECC field.

Format 4: A synchronization flag field may be located in a DataType field in a packet header of a data packet, and a synchronization flag is carried in the DataType field.

Figure 16:
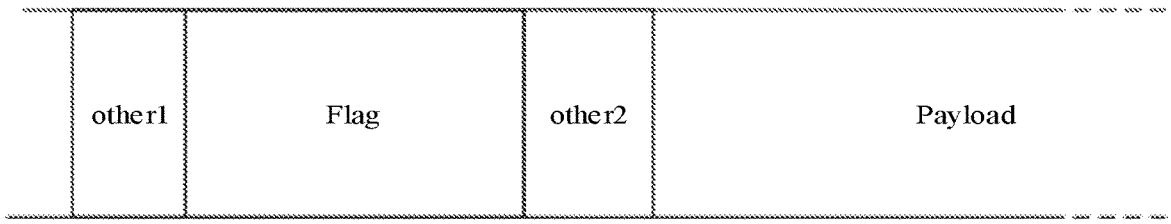
FIG. 16 is a schematic diagram of a packet header of a newly defined data packet according to a fourth embodiment of this disclosure.

In conclusion, the synchronization flag may be configured at any location of a packet header of a data packet. For example, FIG. 16 is a schematic diagram of a packet header of a newly defined data packet according to another embodiment of this disclosure. As shown in FIG. 16, a synchronization flag may be configured at any location of the packet header. Several fields may be included before the synchronization flag, for example, a DataType field or a WordCount field. Several fields may also be included after the synchronization flag, for example, an RSV field or an ECC field. In this way, the data packet carrying image data can also implement a display synchronization function.

In a possible implementation, one data packet may include a plurality of lines of image data. In this case, the processor may record a data length of one line of image data in the foregoing reserved field, that is, the RSV field. The display device may determine, by using a bit value in the reserved field, a data length of each line of image in the frame of image data, to perform line division on a plurality of lines of image data included in a data block.

In a possible implementation, the processor implicitly includes the synchronization flag in the data packet without increasing packet header overheads of the data packet. For example, when generating an ECC field of the data packet, the electronic device may implicitly include the synchronization flag in the ECC field by using a preset encoding algorithm, so that the ECC field has an error detection and correction function, and can be further used to implement display synchronization. For example, for the first data packet of a frame of image data, a quantity of 0s in an ECC field corresponding to the first data packet is greater than a quantity of 1s. For the last data packet of a frame of image data, a quantity of 1s in an ECC field corresponding to the last data packet is greater than a quantity of 0s. For a data packet of a line of image data, a quantity of is in an ECC field corresponding to the data packet is the same as a quantity of 0s. The processor may generate a value of a preset field by using a preset encoding algorithm, so that the value of the preset field can be used as a synchronization flag of an associated data block.

In a possible implementation, the processor may further divide the ECC field, and reduce an error detection and correction capability, to use a field obtained through division to carry the synchronization flag. For example, a length of the ECC field is 8 bits, and a preset quantity of bits in the 8 bits may be used as the synchronization flag. For example, the first 3 bits or the last 3 bits are used as the synchronization flag.

Figure 17:
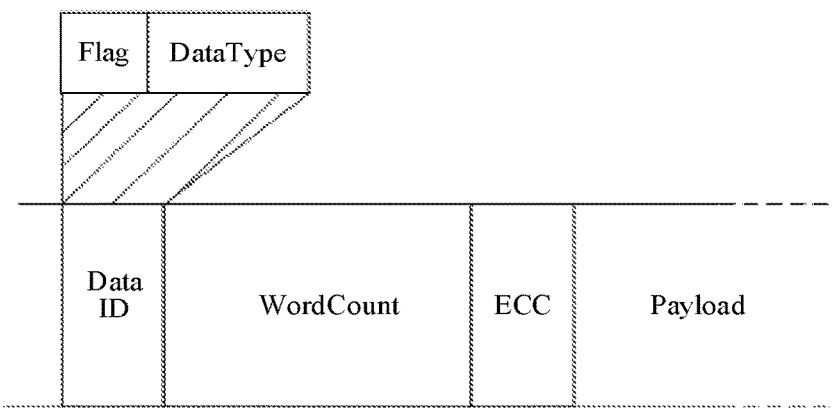
FIG. 17 is a schematic diagram of a packet header of a newly defined data packet according to a fifth embodiment of this disclosure.

In a possible implementation, for a data packet to which a synchronization flag is added, a synchronization signal may not need to be transmitted by using a dedicated signal line or a bidirectional bus. Therefore, a transmission virtual channel identifier may be omitted. Therefore, a transmission virtual channel identifier in a packet header of the data packet is replaced with the synchronization flag, that is, a value of an original transmission virtual channel is identified as a value of the synchronization flag. For example, for a corresponding packet header format of the data packet, refer to FIG. 17.

In a possible implementation, the synchronization flag may be placed at a packet tail of the data packet. The packet tail of the data packet may include a reserved field. In this case, any preset quantity of bits in the reserved field may be used as the synchronization flag. For example, first 3 bits in the reserved field are used as the synchronization flag, which are respectively SOF, SOL, and EOF.

In a possible implementation, a process in which the processor encapsulates a data block into a data packet may occur at an application layer. Alternatively, after the application layer of the processor obtains image data from an application and transmits the image data to a session layer, a data block is encapsulated at the session layer, to generate a data packet including a synchronization flag. The application layer of the processor may sequentially read several lines of data in the image data to generate a data block, and encapsulate the data block into a data packet by using a corresponding network layer.

It should be noted that for another implementation of S901, refer to S2001 and S2002 in Embodiment 2, S2101 in Embodiment 3, and S2201 and S2202 in Embodiment 4.

In S902, the processor sequentially sends all data packets of the display data to the display module.

In this embodiment, after generating a plurality of data packets that include synchronization flags and that are of each frame of image data, the processor may sequentially send the data packets to the display module through a data path. It should be noted that the data path between the processor and the display module may be in a low-power-consumption mode in a sending interval period of the data packets, and when the data packets need to be transmitted, the data path may be switched to a high-speed transmission mode, to send the data packets of the image data with a low latency.

In a possible implementation, the processor may determine a sending interval between the data packets based on a picture refresh frequency of the display module, and sequentially send the plurality of data packets of each frame of image data to the display module based on the sending interval.

Figure 18:
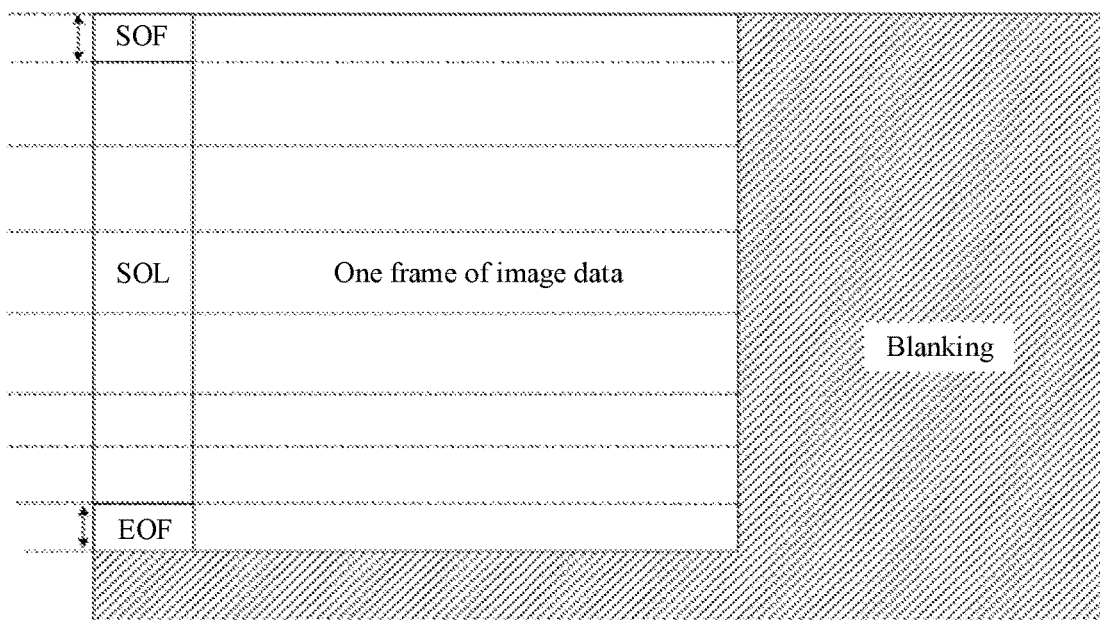
FIG. 18 is a schematic diagram of mode switching in a data packet sending process according to an embodiment of this disclosure.

For example, FIG. 18 is a schematic diagram of mode switching in a data packet sending process according to an embodiment of this disclosure. As shown in FIG. 18, based on different locations of data blocks included in data packets in image data, corresponding synchronization flags are different. For the first data block of the image data, for example, a data block including the first line of image data, a synchronization flag of the first data block is SOF (for example, an SOF bit in the synchronization flag is set to 1, and another bit is set to 0). For a data block including the last line of image data, a synchronization flag of the data block is EOF (for example, an EOF bit in the synchronization flag is set to 1, and another bit is set to 0). For a data block corresponding to image data other than the first line of image data and the last line of image data, a synchronization flag of the data block may be SOL (for example, an SOL bit in the synchronization flag is set to 1). Compared with the process in which the existing DSI interface sends image data in FIG. 5, in this embodiment of this disclosure, when the foregoing data packets are transmitted, the data path between the processor and the display module is in a high-speed transmission mode, and the data path is in a low-power-consumption mode in a sending interval period between the data packets, that is, a blanking period in the figure. It can be learned that, the synchronization flag is encapsulated in the data packet for data transmission, so that the blanking period is not separated. For example, none of the HSA period, the HBP period, the VSA period, and the VBP period in FIG. 5 exists, so that continuity of the low-power-consumption mode can be maintained without frequently entering and exiting the high-speed transmission mode, thereby reducing power consumption of the device.

For example, the following describes, by using an application scenario, a display process in which the processor sends a plurality of data packets of the display data. An album application runs on the electronic device. If the electronic device detects that a user taps any video file in an album, the electronic device uses the video file as to-be-displayed display data. The processor parses the video data to obtain a plurality of frames of video images corresponding to the video data. An application layer of the processor obtains a frame of video image from the album application. For example, the processor may store the obtained video image in a memory area of a memory. Further, the obtained video image may be stored in a cache area in the memory area. The application layer of the processor transmits the video data to a session layer of the processor. The session layer of the processor reads several lines of data of the frame of video image to generate a data block. The session layer of the processor generates a synchronization flag corresponding to the data block, and encapsulates the data block and the synchronization flag to generate a corresponding data packet. The data packet may be sequentially packed and encapsulated at a transport layer and a network layer of the processor, the packed data packet is converted into an electrical signal at a data link layer, and the electrical signal is transmitted to the display module by using a communication link between the processor and the display module, to implement a data packet sending operation.

It should be noted that for another implementation of S902, refer to S2003 in Embodiment 2, S2102 in Embodiment 3, and S2203 in Embodiment 4.

In S903, the display module sequentially parses the data packets sent by the processor to obtain a synchronization flag associated with each data packet, and determines a display location of each data block on the display panel based on the synchronization flag to display the display data.

In this embodiment, the display module may receive, by using a high-speed transmission interface, the data packet sent by the processor, parse the data packet, and extract the synchronization flag carried in a preset field in the data packet. It should be noted that, before the display module and the processor transmit the data packet of the image data, a format of the data packet may be predetermined. In other words, a meaning, that is, a communication protocol, corresponding to each field in the data packet is determined. The display module may determine, according to a pre-agreed communication protocol, a field in which the synchronization flag is located in the data packet, and obtain a bit value corresponding to the field. If the synchronization flag is encapsulated in a packet header of a data long packet, the packet header of the data long packet may be parsed to determine a value of a field corresponding to the synchronization flag in the packet header of the long packet, so as to obtain the synchronization flag associated with the data packet. Correspondingly, if the synchronization flag is encapsulated in a packet tail of a long packet, the packet tail of the data long packet may be parsed to determine a value of a field corresponding to the synchronization flag in the packet tail of the long packet, so as to obtain the synchronization flag associated with the data packet.

In this embodiment, the display module of the electronic device may determine, based on the synchronization flag associated with the data packet, the display location of the data block corresponding to the data packet on the display panel. In a possible implementation, if the refresh direction of the display module is from top to bottom, a data block in a data packet in which a synchronization flag is SOF is displayed in the first line of the display panel, a data block in a data packet in which a synchronization flag is EOF is displayed in the last line of the display panel, and a data block in a data packet in which a synchronization flag is SOL may be sequentially arranged based on a display number corresponding to the data block, so that image data that needs to be displayed can be restored on the display panel.

Figure 19:
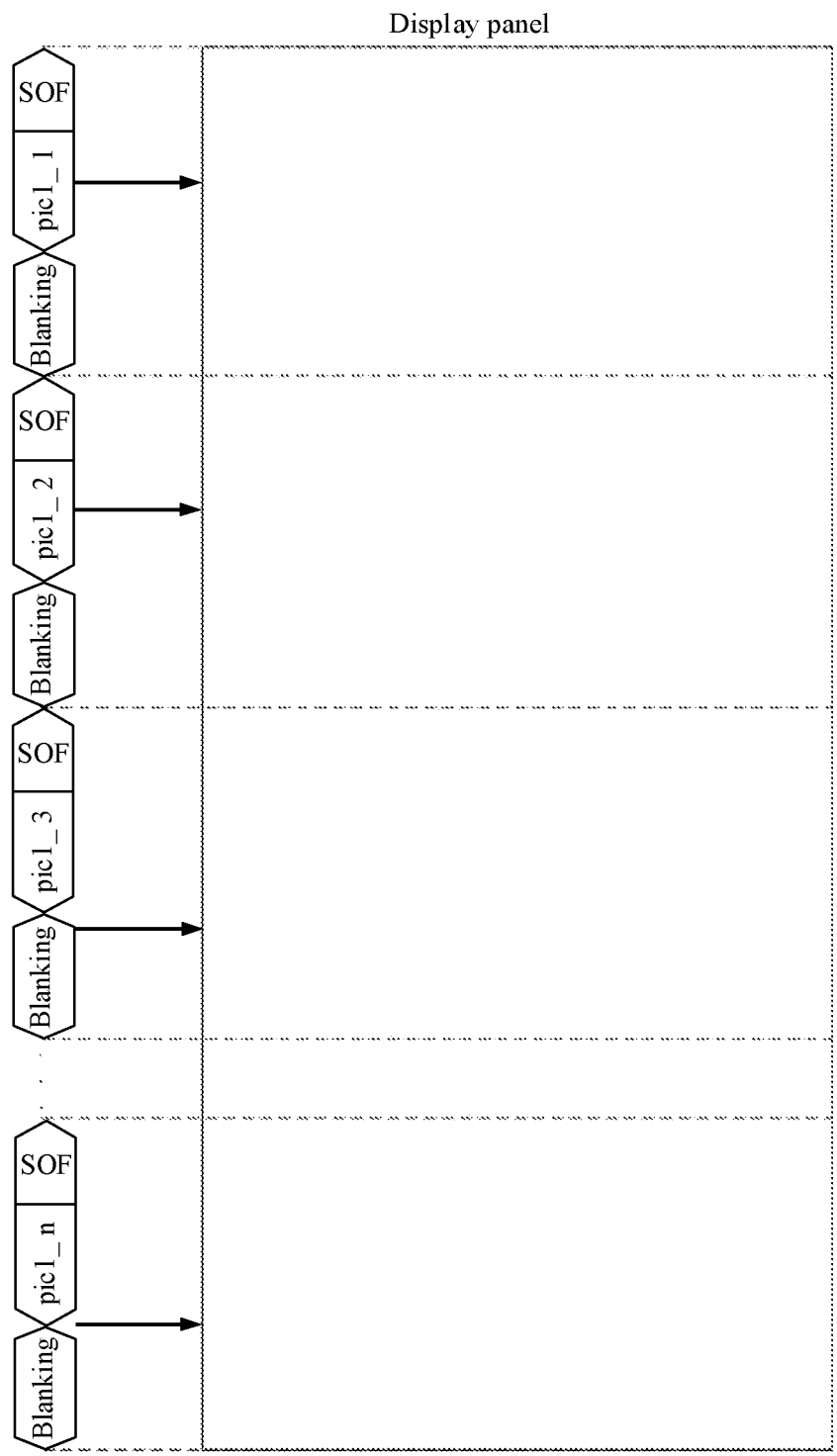
FIG. 19 is a schematic diagram of displaying image data according to an embodiment of this disclosure.

For example, FIG. 19 is a schematic diagram of displaying image data according to an embodiment of this disclosure. As shown in FIG. 19, the processor sends data packets to the display module based on a frame sequence number of each piece of image data and a display number of each data block. Each data packet carries a data block of the image data, such as pic1_1, pic1_2, and pic1_3. The display module sequentially receives the data packets, and a receiving sequence includes pic1_1→pic1_2→pic1_3. The display module sequentially identifies synchronization flags in the data packets. For example, a synchronization flag in the first data packet pic1_1 sent for the first frame of image data is SOF, and the display module displays pic1_1 in the first line of the display panel. Then, the display module parses a synchronization flag in the second data packet pic1_2 of the first frame of image data, determines that the synchronization flag is SOL, and displays pic1_2 in a next line of the line for displaying pic1_1, and so on. If it is detected that a synchronization flag in pic1_n is EOF, it indicates that the data block is the last data block of the frame of image data. After the data block is displayed, the image data is completely displayed on the displaying panel. Then, the display device receives a data packet of the second frame of image data sent by the processor, and repeatedly performs the foregoing operations to display the second frame of image data.

In this embodiment, if the processor sends the data packets in a preset time sequence, the display module may sequentially display data blocks of the data packets in the time sequence of the processor. If the display module is configured with a time sequence controller, the received data packets may be sequentially parsed by using the local time sequence controller, and data blocks of the data packets are displayed.

It should be noted that for another implementation of S903, refer to S2004 in Embodiment 2, S2104 to S2106 in Embodiment 3, and S231 and S232 in Embodiment 4.

It can be learned from the foregoing that, in the display synchronization method provided in this embodiment of this disclosure, the processor may divide the display data to generate a plurality of data blocks, configure a corresponding synchronization flag for each data block, encapsulate the synchronization flag and the data block in a data packet, and send the data packet to the display module. After receiving the data packet that includes the data block and the synchronization flag, the display module may determine a display location of the associated data block based on the synchronization flag, to restore the display data and display the display data on the display panel. This implements display synchronization between the processor and the display module of the electronic device. Compared with that in an existing display synchronization technology, an additional synchronization short packet does not need to be sent, and therefore the electronic device does not need to frequently enter a high-speed transmission mode, so that energy consumption of the electronic device is reduced. In addition, the foregoing synchronization flag transmission manner does not depend on a dedicated signal line or a bidirectional transmission line to transmit the synchronization flag, and does not increase cabling difficulty of the electronic device, so that costs of the electronic device are reduced.

Embodiment 2

Figure 20:
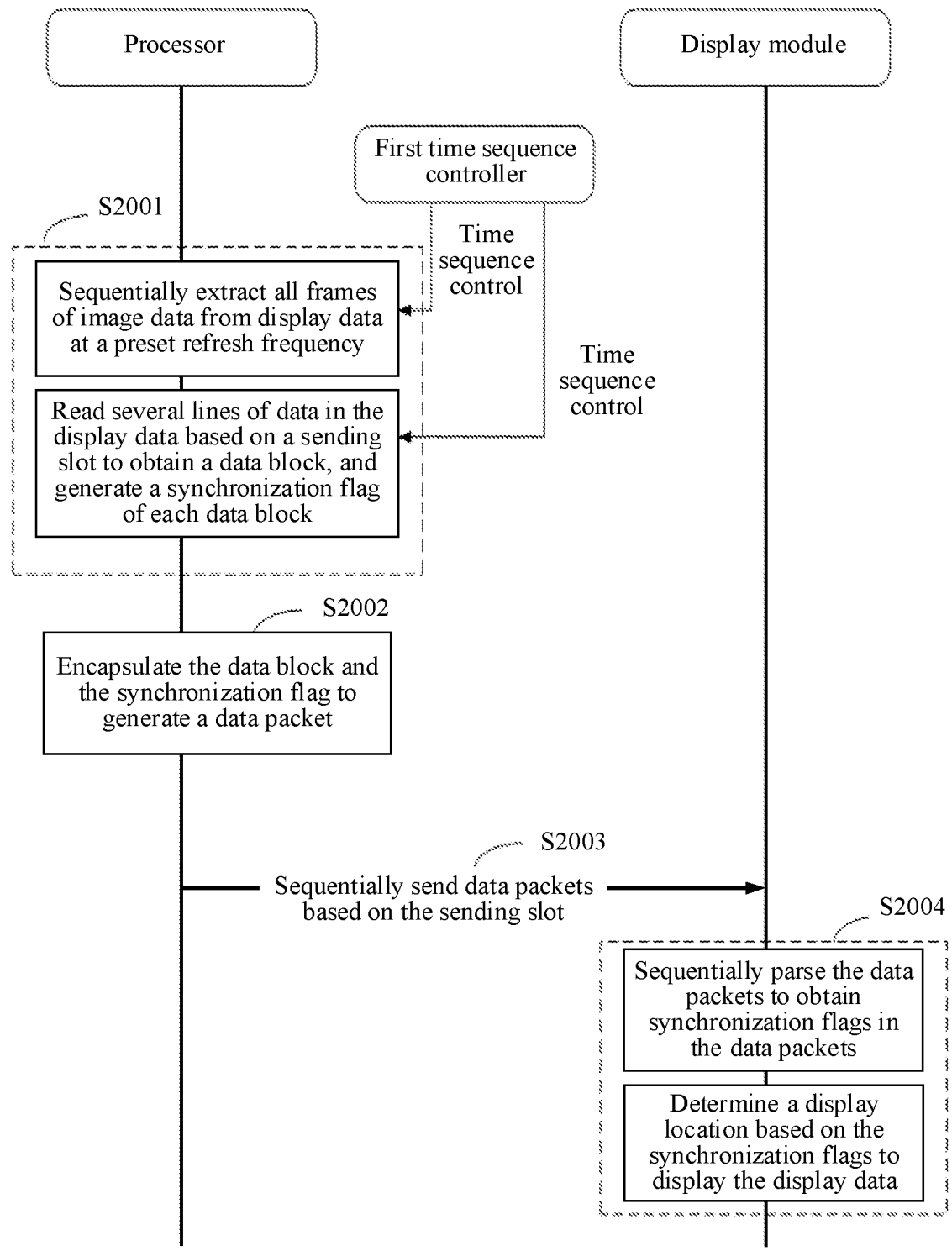
FIG. 20 shows a display synchronization method according to another embodiment of this disclosure.

FIG. 20 shows a display synchronization method according to another embodiment of this disclosure. Compared with the foregoing embodiment, in this embodiment, a display time sequence is determined by a processor of an electronic device. The processor includes a first communication interface, a first cache area, and a first time sequence controller. A display module of the electronic device includes a second communication interface and a display panel. In this case, the display synchronization method includes the following steps.

In S2001, the processor sequentially extracts all frames of image data from display data at a preset refresh frequency by using the first time sequence controller, the processor reads some data in the image data based on a preset sending slot by using the first time sequence controller to generate a data block, and the processor generates a synchronization flag of the data block.

In this embodiment, the first time sequence controller is built in the processor, and the first time sequence controller is configured to control a refresh frequency of the display data. Particularly, if the display data is video data or dynamic image data, this type of display data includes a plurality of frames of image data. To implement continuous and smooth display, the display module needs to display each frame of image data in the display data at a stable refresh frequency.

For example, 60 frames of image data are displayed per second, that is, 60 frames per second (fps). In this case, the processor needs to determine, by using the first time sequence controller, a time interval for reading each frame of image in a display image. If the display module uses 60 fps, the refresh frequency is 1/60 seconds (s). The processor reads each frame of image data in the display data based on the preset time interval, and generates a plurality of data blocks of the image data and synchronization flags associated with the plurality of data blocks.

In this embodiment, the processor may include a memory, and the memory includes the foregoing first cache area.

In this embodiment, an application layer of the processor may obtain to-be-displayed display data from a running application (such as an album application, a video play application, and a browser application), and store the display data in the first cache area of the processor. In this case, the processor may generate a read request based on a preset first refresh frequency by using the first time sequence controller. When detecting the read request, the application layer of the processor obtains a frame of image data in the display data from the application, and stores the frame of image data in the first cache area.

In this embodiment, in addition to controlling the refresh frequency, the first time sequence controller is further configured to control a rate at which the processor reads a data block. The first time sequence controller may generate a sending instruction based on a preset sending slot. When receiving the sending instruction of the first time sequence controller, the processor may read several lines of data in the stored image data from the first cache area, generate a corresponding data packet, and generate, based on locations of the several lines of read data in the image data, a synchronization flag corresponding to the data block. It should be noted that sending time sequences of different data blocks may be the same or may be different, and a specific length of the sending slot is determined by the first time sequence controller.

It should be noted that a process of generating the synchronization flag of the data block is completely the same as an implementation process in the foregoing embodiment. For specific descriptions, refer to related descriptions of S901. Details are not described herein again. S2001 is an implementation of S901 in Embodiment 1.

In S2002, the processor encapsulates the data block and the synchronization flag associated with the data block to generate a data packet.

In this embodiment, a process of encapsulating the data packet is completely the same as an implementation process in the foregoing embodiment. For specific descriptions, refer to related descriptions of S901. Details are not described herein again. S2002 is an implementation of S901 in Embodiment 1.

In S2003, the processor sequentially sends all data packets to the display module based on the sending slot.

In this embodiment, after obtaining a data packet through encapsulation, the processor may send the data packet to the display module by using a communication link between the processor and the display module. Because a read operation of the processor is performed based on the sending slot of the first time sequence controller, and a sending operation is performed when a data packet is generated, a time interval of sending the data packets is consistent with the sending slot of the first time sequence controller.

It should be noted that, a process of sending the data packet is completely the same as an implementation process in the foregoing embodiment. For specific descriptions, refer to related descriptions of S902. Details are not described herein again. S2003 is an implementation of S902 in Embodiment 1.

In S2004, the display module sequentially parses the data packets sent by the processor to obtain a synchronization flag associated with each data packet, and determines a display location of each data block on the display panel based on the synchronization flag to display the image data.

In this embodiment, each data packet is sent based on a fixed slot and refresh frequency. Therefore, when receiving each data packet, the display module may parse the data packet, and determine, based on a synchronization flag in the data packet, a display location of a data block in each data packet on the display panel, to restore the image data that needs to be displayed. For a specific display procedure, refer to the specific descriptions of S903 in the foregoing embodiment, and details are not described herein again. S2004 is an implementation of S903 in Embodiment 1.

In this embodiment, because a slot and a sending frequency are controlled by the processor, the display module may not need to be configured with a time sequence controller and a cache area (because a plurality of data packets are not continuously received, a specific sending slot exists between different data packets), and may directly parse and display the received data packet.

In this embodiment of this disclosure, each data packet of the display data carries a synchronization flag, and a blanking period does not need to be separated, so that the electronic device can continuously maintain a low-power-consumption mode, thereby reducing energy consumption of the electronic device. In addition, the electronic device does not need to be configured with an additional dedicated signal line to transmit a synchronization signal, so that circuit cabling difficulty is reduced. In addition, because the sending time sequence is controlled by the processor of the electronic device, the display module does not need to have a capability of caching a frame of image data and a time sequence control capability, thereby reducing a hardware requirement of the display module, and further reducing costs of the display module, that is, reducing costs of the electronic device.

Embodiment 3

Figure 21:
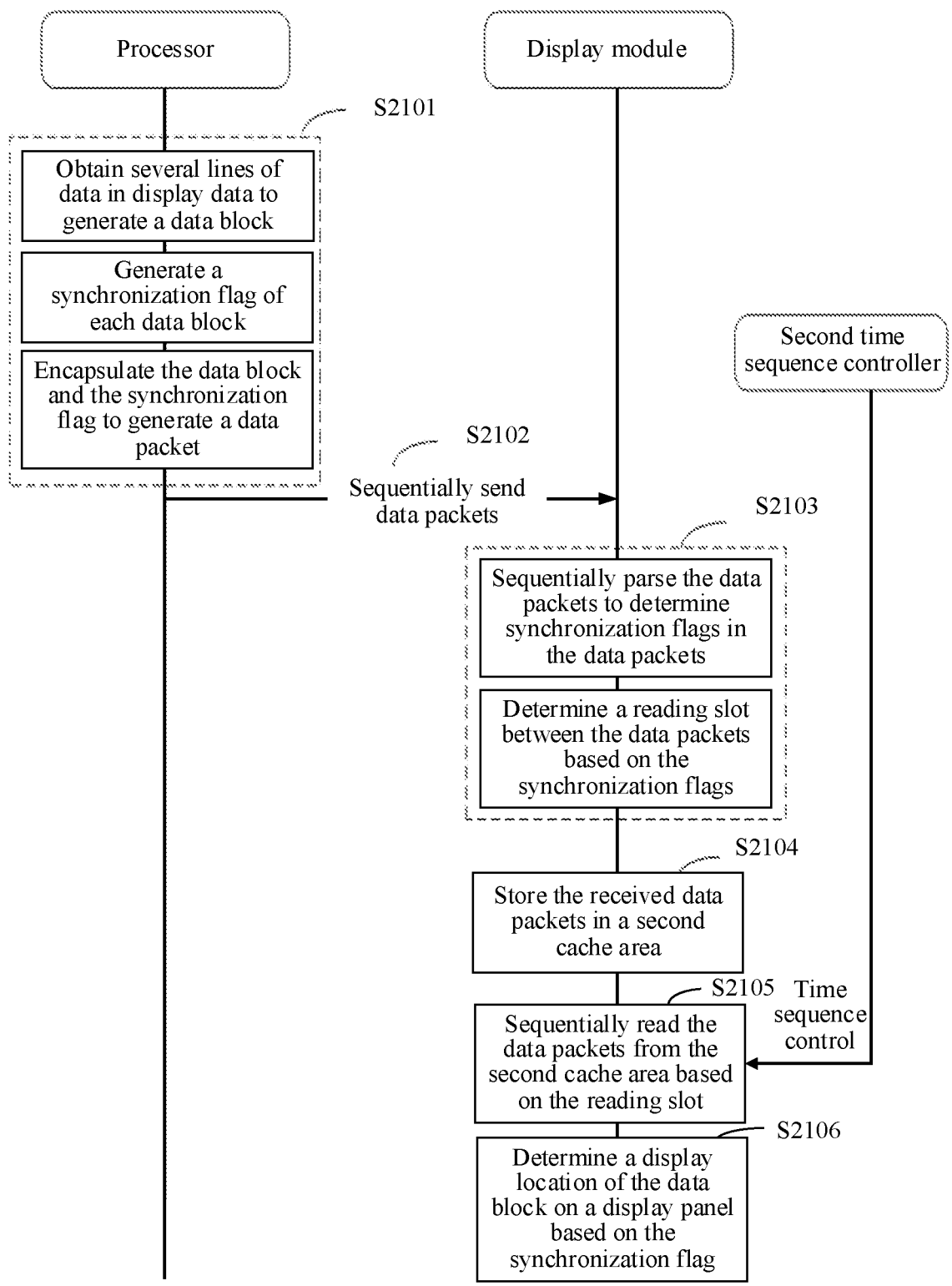
FIG. 21 shows a display synchronization method according to another embodiment of this disclosure.

FIG. 21 shows a display synchronization method according to another embodiment of this disclosure. Compared with the foregoing embodiment, in this embodiment, a display time sequence is determined by a display module of an electronic device. A processor includes a first cache area and a first communication interface. The display module of the electronic device includes a second communication interface, a second time sequence controller, a second cache area, and a display panel. In this case, the display synchronization method includes the following steps.

In S2101, the processor sequentially extracts all frames of image data from display data, and sequentially reads some data in the image data to generate a data block, the processor generates a synchronization flag corresponding to the data block, and the processor encapsulates the data block and the synchronization flag corresponding to the data block to generate a data packet.

In S2102, the processor sequentially sends all data packets to the display module.

In this embodiment, implementation processes of S2101 and S2102 are completely the same as implementation processes of S901 and S902 in Embodiment 1. For specific descriptions, refer to related descriptions of S901 and S902.

Details are not described herein again. S2101 is an implementation of S901 in Embodiment 1, and S2102 is an implementation of S902 in Embodiment 1.

In S2103, the display module sequentially parses all received data packets, determines a synchronization flag carried in each data packet, and determines a reading slot between the data packets based on the synchronization flag included in each data packet.

In this embodiment, after receiving the data packet sent by the processor, the display module parses the data packet to determine the synchronization flag carried in the data packet. A field in which the synchronization flag is located is pre-agreed on between the processor and the display module, that is, may be determined according to a communication protocol. For example, if the synchronization flag is stored in a packet header of the data packet, the display module may read a value of a field corresponding to the packet header of the data packet, and use the value of the field as the synchronization flag in the data packet.

In this embodiment, different synchronization flags correspond to different blanking periods. For example, the last data packet of the image data, that is, a data packet in which a synchronization flag is EOF, needs to be distinguished from a next frame of image, and a vertical front period VFP is included. In a display process, reading slot duration of reading a data packet by the display module is t1. Any data packet in which a synchronization flag is SOL in the image data needs to be distinguished from a previous line of image data, and a horizontal blanking period is included. In a display process, reading slot duration of reading a data packet by the display module is t2, and t1 and t2 may be different or may be the same. Therefore, reading time sequences of different data packets need to match synchronization flags in the data packets. After determining the synchronization flag in the data packet, the processor may determine a reading slot between all the data packets.

In S2104, the display module stores the received data packets in the second cache area.

In this embodiment, a processor side does not undertake a time sequence control task, and a time interval and frequency of sending a data packet by the processor are not necessarily corresponding to a fixed time sequence. Therefore, the display module may store the received data packets in a local cache area, that is, the second cache area, and then implement time sequence control of a display synchronization process by using the second time sequence controller of the display module, for example, an operation of reading a data packet in a fixed time sequence and displaying a data block of each data packet.

In a possible implementation, a storage capacity of the second cache area may be greater than or equal to a data amount of one frame of image data. In this case, the processor may continuously send all data packets of one frame of image data to the display module, and the display module implements time sequence control of display synchronization for all the data packets by using the second time sequence controller. If the storage capacity of the second cache area is greater than one frame of image data, the display module stores one complete frame of image data. In a case in which the processor does not send image data, the display module may use one complete frame of image data stored in the second cache area, and image refresh on the display panel of the display module is not affected (that is, the image data stored in the second cache area is still displayed after each time of refresh).

In a possible implementation, a storage capacity of the second cache area may be less than a data amount of one frame of image data. In this case, the storage capacity of the second cache area may be determined based on a data sending rate of the processor, to ensure that a data reading rate of the display module matches the data sending rate.

In S2105, the display module sequentially reads all the data packets from the second cache area based on the reading slot by using the second time sequence controller.

In this embodiment, the second time sequence controller may determine, based on the foregoing determined reading time sequence, a reading time point corresponding to each data packet. If a reading time sequence of a data packet arrives, the second time sequence controller may generate a read request, and the display module may obtain a corresponding data packet from the second cache area after detecting the read request.

In S2106, the display module determines a display location of the data block in the data packet on the display panel based on the synchronization flag in the data packet, to display each piece of image data.

In this embodiment, a specific implementation of S2106 is completely the same as an implementation process of S903 in Embodiment 1. For specific descriptions, refer to related descriptions of S903. Details are not described herein again. S2104 to S2106 are an implementation of S903 in Embodiment 1.

It should be noted that, time sequence control on reading and display of each data packet is implemented by using the second time sequence controller of the display module. Each data packet is read in the foregoing reading time sequence, and a data block of each data packet is displayed. A picture is refreshed on a display panel side at a preset refresh frequency.

In this embodiment of this disclosure, the synchronization flag of each data packet may also be encapsulated in the data packet, and the synchronization flag does not need to be transmitted by using an additional synchronization short packet or a dedicated signal line, so that the electronic device can be kept in a low-power-consumption mode in an entire blanking period. Therefore, power consumption of the device is reduced without increasing cabling difficulty of the device, and a bus structure is simplified.

Embodiment 4

Figure 22:
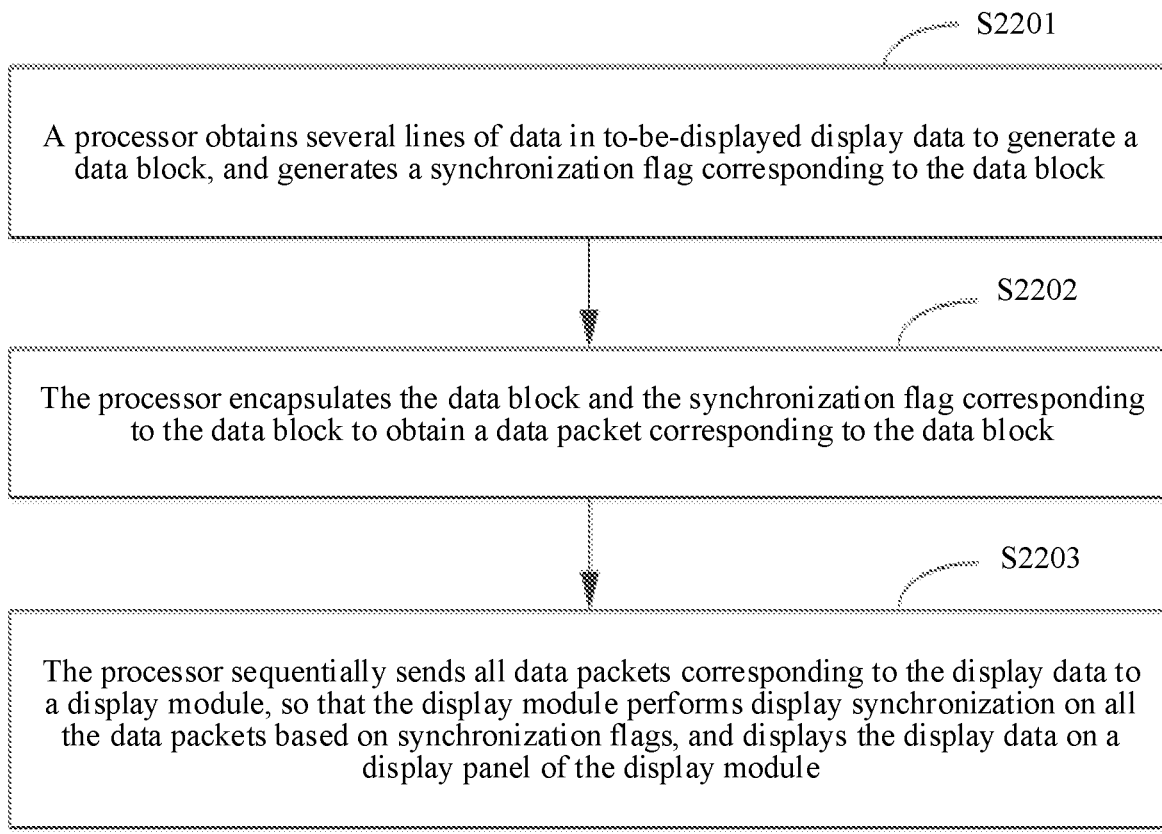
FIG. 22 is a flowchart of implementation of a display synchronization method on a processor side according to an embodiment of this disclosure.

Embodiments 1 to 3 describe an implementation process of a display synchronization method from a perspective of interaction between a processor and a display module of an electronic device. In Embodiment 4, a processor is used as a process execution body to describe an implementation process of a display synchronization method. FIG. 22 is a flowchart of implementation of a display synchronization method on a processor side according to an embodiment of this disclosure. Details are as follows.

In S2201, the processor obtains several lines of data in to-be-displayed display data to generate a data block, and generates a synchronization flag corresponding to the data block.

In S2202, the processor encapsulates the data block and the synchronization flag corresponding to the data block to obtain a data packet corresponding to the data block.

In S2203, the processor sequentially sends all data packets corresponding to the display data to a display module, so that the display module performs display synchronization on all the data packets based on synchronization flags, and displays the display data on a display panel of the display module.

Optionally, if the processor includes a first time sequence controller, S2201 includes sequentially extracting all frames of image data from the display data at a preset refresh frequency by using the first time sequence controller, and reading several lines of data in the image data based on a preset sending slot by using the first time sequence controller, to generate the data block.

Correspondingly, S2203 includes that the processor sequentially sends all data blocks to the display module based on the sending slot.

Optionally, that the processor encapsulates the data block and the synchronization flag corresponding to the data block to obtain a data packet corresponding to the data block includes the following. The processor uses the synchronization flag as a value of a preset first field in a data packet template, and adds the data block to a preset second field in the data packet template, to obtain the data packet.

Embodiment 5

Figure 23:
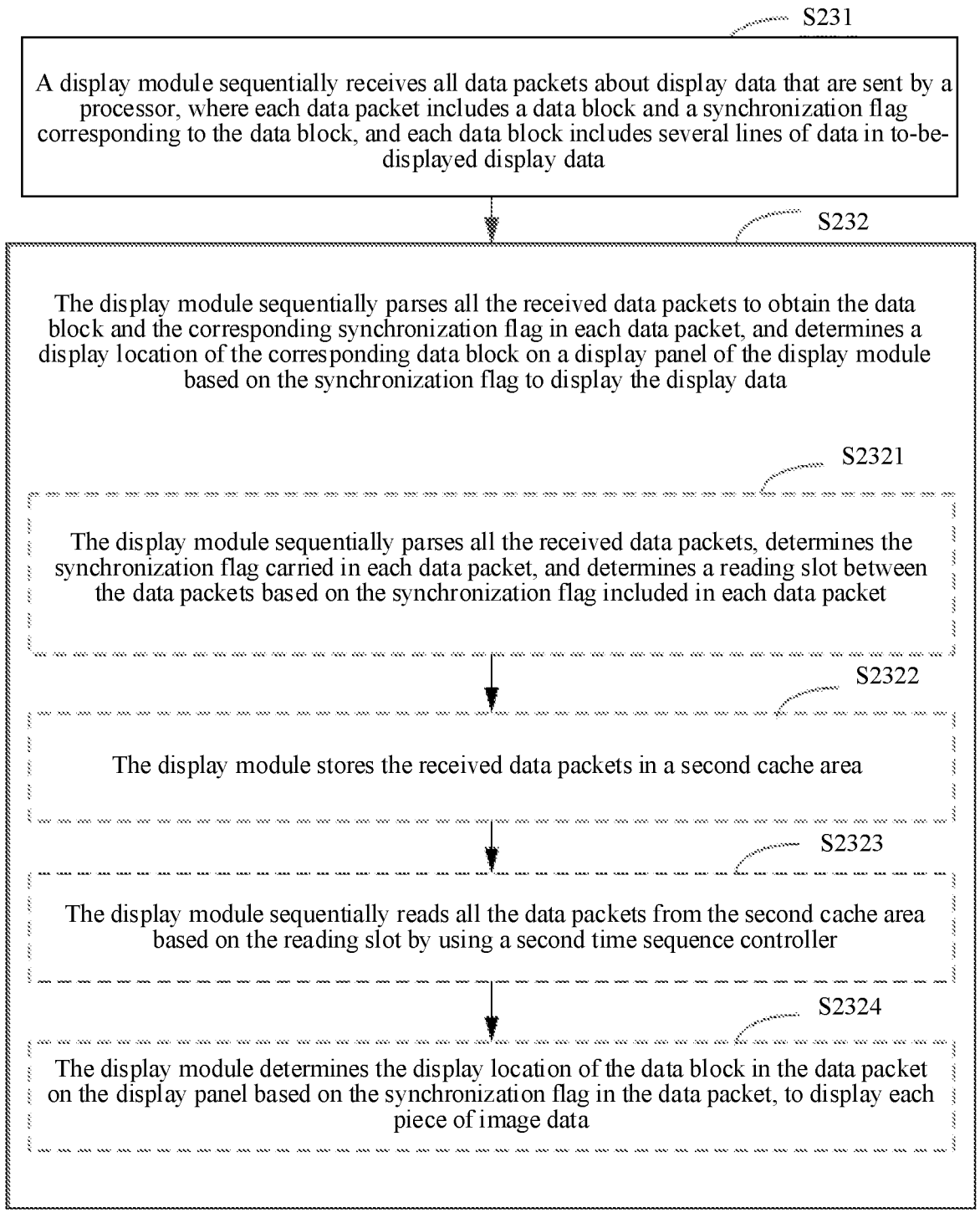
FIG. 23 is a flowchart of implementation of a display synchronization method on a display module side according to an embodiment of this disclosure.

Embodiments 1 to 3 describe an implementation process of a display synchronization method from a perspective of interaction between a processor and a display module of an electronic device. In Embodiment 5, a display module is used as a process execution body to describe an implementation process of a display synchronization method. FIG. 23 is a flowchart of implementation of a display synchronization method on a display module side according to an embodiment of this disclosure. Details are as follows.

In S231, the display module sequentially receives all data packets about display data that are sent by a processor, where each data packet includes a data block and a synchronization flag corresponding to the data block, and each data block includes several lines of data in to-be-displayed display data.

In S232, the display module sequentially parses all the received data packets to obtain the data block and the corresponding synchronization flag in each data packet, and determines a display location of the corresponding data block on a display panel of the display module based on the synchronization flag to display the display data.

Optionally, if the display module includes a second cache area and a second time sequence controller, S232 includes the following steps.

In S2321, the display module sequentially parses all the received data packets, determines the synchronization flag carried in each data packet, and determines a reading slot between the data packets based on the synchronization flag included in each data packet.

In S2322, the display module stores the received data packets in the second cache area.

In S2323, the display module sequentially reads all the data packets from the second cache area based on the reading slot by using the second time sequence controller.

In S2324, the display module determines the display location of the data block in the data packet on the display panel based on the synchronization flag in the data packet, to display each piece of image data.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this disclosure.

Embodiment 6

Figure 24:
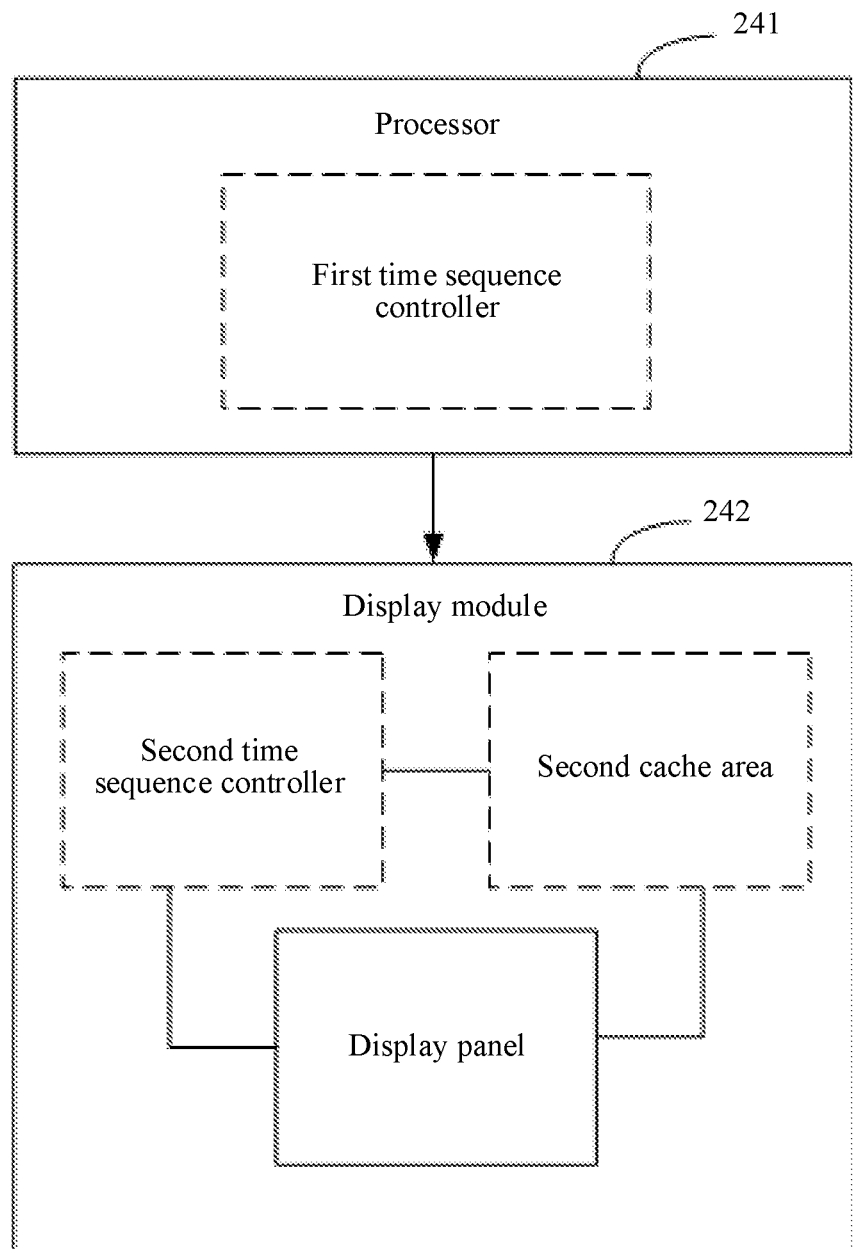
FIG. 24 is a block diagram of a structure of a display synchronization apparatus according to an embodiment of this disclosure.

Corresponding to the display synchronization method in the foregoing embodiments, FIG. 24 is a block diagram of a structure of a display synchronization apparatus according to an embodiment of this disclosure. For ease of description, only parts related to embodiments of this disclosure are shown.

As shown in FIG. 24, the display synchronization apparatus includes a processor 241 configured to obtain several lines of data in to-be-displayed display data to generate a data block, where the processor 241 is configured to generate a synchronization flag corresponding to the data block, the processor 241 is configured to encapsulate the data block and the synchronization flag corresponding to the data block to obtain a data packet corresponding to the data block, and the processor 241 is configured to sequentially send all data packets corresponding to the display data to a display module 242, and the display module 242 configured to sequentially parse all received data packets to obtain a data block and a corresponding synchronization flag in each data packet, and determine a display location of the data block corresponding to the synchronization flag on a display panel of the display module 242 based on the synchronization flag to display the display data.

In a possible implementation, that the processor 241 is configured to encapsulate the data block and the synchronization flag corresponding to the data block to obtain a data packet corresponding to the data block includes that the processor 241 is configured to use the synchronization flag as a value of a preset first field in a data packet template, and add the data block to a preset second field in the data packet template, to obtain the data packet.

In a possible implementation, if the processor 241 includes a first time sequence controller, that the processor 241 is configured to obtain several lines of data in to-be-displayed display data to generate a data block includes that the processor 241 is configured to sequentially extract all frames of image data from the display data at a preset refresh frequency by using the first time sequence controller, and the processor 241 is configured to read several lines of data in the image data based on a preset sending slot by using the first time sequence controller, to generate the data block.

In a possible implementation, that the processor 241 is configured to sequentially send all data packets to a display module 242 includes that the processor 241 is configured to sequentially send all data blocks to the display module 242 based on the sending slot.

In a possible implementation, if the display module 242 includes a second time sequence controller and a second cache area, that the display module 242 is configured to sequentially parse all the data packets sent by the processor to obtain a data block and a corresponding synchronization flag in each data packet, and determine a display location of each data block on a display panel of the display module 242 based on the synchronization flag to display the display data includes that the display module 242 is configured to sequentially parse all the received data packets to obtain the data block and the corresponding synchronization flag in each data packet, and determine a reading slot between all the data packets based on the synchronization flag, the display module 242 is configured to store the received data packets in the second cache area, the display module 242 is configured to sequentially read all the data packets from the second cache area based on the reading slot by using the second time sequence controller, and the display module 242 is configured to determine the display location of the data block in the data packet on the display panel based on the synchronization flag in the data packet, to display each piece of image data.

Therefore, the display synchronization apparatus provided in this embodiment of this disclosure may also divide the display data by using the processor to generate a plurality of data blocks, configure a corresponding synchronization flag for each data block, encapsulate the synchronization flag and the data block in a data packet, and send the data packet to the display module. After receiving the data packet that includes the data block and the synchronization flag, the display module may determine a display location of the associated data block based on the synchronization flag, to restore the display data and display the display data on the display panel. This implements display synchronization between the processor and the display module of the electronic device. Compared with that in an existing display synchronization technology, an additional synchronization short packet does not need to be sent, and therefore the electronic device does not need to frequently enter a high-speed transmission mode, so that energy consumption of the electronic device is reduced. In addition, the foregoing synchronization flag transmission manner does not depend on a dedicated signal line or a bidirectional transmission line to transmit the synchronization flag, and does not increase cabling difficulty of the electronic device, so that costs of the electronic device are reduced.

Figure 25:
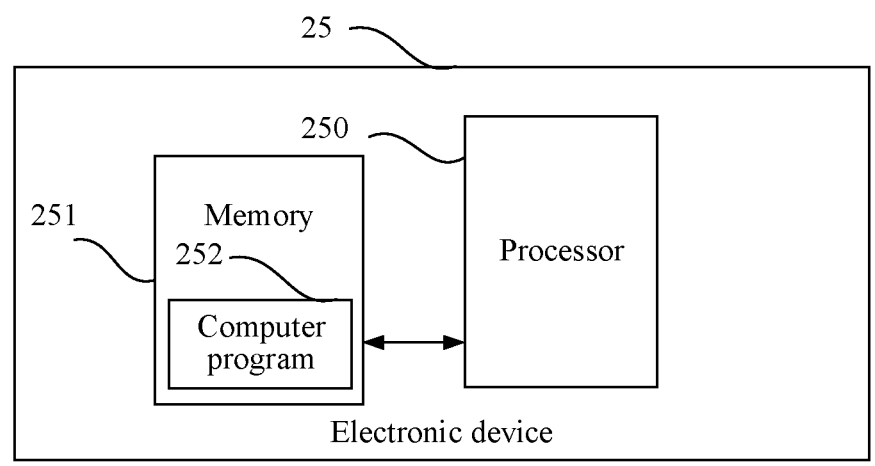
FIG. 25 is a block diagram of a structure of an electronic device according to an embodiment of this disclosure.

FIG. 25 is a schematic diagram of a structure of an electronic device according to an embodiment of this disclosure. As shown in FIG. 25, the electronic device 25 in this embodiment includes at least one processor 250 (only one processor is shown in FIG. 25), a memory 251, and a computer program 252 that is stored in the memory 251 and that can be run on the at least one processor 250. When executing the computer program 252, the processor 250 implements the steps in any of the foregoing display synchronization method embodiments.

The electronic device 25 may be a computing device such as a desktop computer, a notebook computer, a palmtop computer, or a cloud server. The electronic device may include but is not limited to including the processor 250 and the memory 251. A person skilled in the art may understand that FIG. 25 is merely an example of the electronic device 25, and does not constitute a limitation on the electronic device 25. The electronic device 25 may include more or fewer components than those shown in the figure, or combine some components, or have different components. For example, the electronic device 25 may further include an input/output device, a network access device, or the like.

The processor 250 may be a central processing unit (CPU), or the processor 250 may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

In some embodiments, the memory 251 may be an internal storage unit of the electronic device 25, for example, a hard disk or memory of the electronic device 25. In some other embodiments, the memory 251 may alternatively be an external storage device of the electronic device 25, for example, a plug-in hard disk, a smart media card (SMC), an SD card, or a flash card that is disposed on the electronic device 25. Further, the memory 251 may alternatively include both an internal storage unit and an external storage device of the electronic device 25. The memory 251 is configured to store an operating system, an application program, a boot loader (BootLoader), data, another program, and the like, for example, program code of the computer program. The memory 251 may be further configured to temporarily store data that has been output or is to be output.

It should be noted that content such as information exchange between the foregoing apparatuses/units and the execution processes thereof is based on a same concept as the method embodiments of this disclosure. For specific functions and technical effects of the content, refer to the method embodiments. Details are not described herein again.

Persons skilled in the art may clearly understand that, for the purpose of convenient and brief description, division into the foregoing function units or modules is merely used as an example for description. In actual application, the foregoing functions may be allocated to different function units or modules for implementation based on a requirement. That is, an inner structure of the apparatus is divided into different function units or modules to implement all or some of the functions described above. Function units or modules in the embodiments may be integrated into one processing unit, or each of the units may exist alone physically, or two or more units may be integrated into one unit. The integrated unit may be implemented in a form of hardware, or may be implemented in a form of a software function unit. In addition, specific names of the function units or modules are merely for ease of distinguishing between the function units or modules, but are not intended to limit the protection scope of this disclosure. For a specific working process of the units or modules in the foregoing system, refer to a corresponding process in the foregoing method embodiments. Details are not described herein again.

An embodiment of this disclosure further provides an electronic device. The electronic device includes at least one processor, a memory, and a computer program that is stored in the memory and that can be run on the at least one processor. When executing the computer program, the processor implements the steps in any one of the foregoing method embodiments.

An embodiment of this disclosure further provides a computer-readable storage medium. The computer-readable storage medium stores a computer program. When the computer program is executed by a processor, the steps in the foregoing method embodiments can be implemented.

An embodiment of this disclosure provides a computer program product. When the computer program product runs on a mobile terminal, the mobile terminal is enabled to implement the steps in the foregoing method embodiments during execution.

When the integrated unit is implemented in a form of a software function unit and sold or used as an independent product, the integrated unit may be stored in a computer-readable storage medium. Based on such an understanding, all or some of the procedures of the method in embodiments of this disclosure may be implemented by a computer program instructing related hardware. The computer program may be stored in a computer-readable storage medium. When the computer program is executed by the processor, steps of the foregoing method embodiments can be implemented. The computer program includes computer program code. The computer program code may be in a source code form, an object code form, an executable file form, some intermediate forms, or the like. The computer-readable medium may include at least any entity or apparatus that can carry the computer program code to a photographing apparatus/electronic device, a recording medium, a computer memory, a read-only memory (ROM), a RAM, an electrical carrier signal, a telecommunications signal, and a software distribution medium, for example, a USB flash drive, a removable hard disk, a magnetic disk, or an optical disk. In some jurisdictions, the computer-readable medium cannot be the electrical carrier signal or the telecommunication signal according to legislation and patent practices.

In the foregoing embodiments, descriptions of the embodiments have respective focuses. For a part that is not described in detail or recorded in an embodiment, refer to related descriptions in other embodiments.

A person of ordinary skill in the art may be aware that, in combination with the examples described in embodiments disclosed in this specification, units and algorithm steps may be implemented by electronic hardware or a combination of computer software and electronic hardware. Whether the functions are implemented by hardware or software depends on specific applications and design constraints of the technical solutions. A person skilled in the art may use different methods to implement the described functions for each particular application, but it should not be considered that the implementation goes beyond the scope of this disclosure.

In the embodiments provided in this disclosure, it should be understood that the disclosed apparatus/network device and method may be implemented in other manners. For example, the described apparatus/network device embodiments are merely examples. For example, division into the modules or units is merely logical function division. In actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between apparatuses or units may be implemented in an electrical, mechanical, or another form.

The units described as separate parts may or may not be physically separate, and parts displayed as units may or may not be physical units, may be located in one place, or may be distributed on a plurality of network units. Some or all of the units may be selected according to an actual requirement to achieve the objectives of the solutions in the embodiments.

The foregoing embodiments are merely used to describe the technical solutions of this disclosure, but not limit the technical solutions of this disclosure. Although this disclosure is described in detail with reference to the foregoing embodiments, persons of ordinary skill in the art should understand that they may still modify the technical solutions described in the foregoing embodiments, or perform equivalent replacement on some technical features. However, these modifications or replacements do not make the essence of the corresponding technical solutions depart from the spirit and scope of the technical solutions in embodiments of this disclosure, and shall fall within the protection scope of this disclosure.

What is claimed is:

1. A method implemented by an electronic device, wherein the method comprises:
    obtaining, by a processor of the electronic device, lines of data in display data to generate a data block;
    generating, by the processor, a synchronization flag corresponding to the data block;
    sequentially extracting, by a first time sequence controller of the processor, all frames of image data from the display data at a preset refresh frequency;
    encapsulating, by the processor, the data block and the synchronization flag to obtain a data packet corresponding to the data block;
    sequentially sending, by the processor, all data packets corresponding to the display data to a display system of the electronic device;
    sequentially parsing, by a second time sequence controller of the display system, the data packets to obtain a second data block and a corresponding synchronization flag in each of the data packets; and
    identifying, by the display system, a display location of the second data block on a display panel of the display system based on the corresponding synchronization flag to display the display data.

2. The method of claim 1, further comprising:
    setting, by the processor, the synchronization flag as a value of a preset first field in a data packet template; and
    adding, by the processor, the data block to a preset second field in the data packet template to obtain the data packet.

3. The method of claim 1, wherein obtaining the lines of data comprises:
    reading, by the processor, second lines of data in the image data based on a preset sending slot using the first time sequence controller to generate the data block.

4. The method of claim 3, wherein sequentially sending all the data packets to the display system comprises sequentially sending, by the processor, all the data packets to the display system based on the preset sending slot.

5. The method of claim 1, wherein the display system comprises a cache area, and wherein the method further comprises:
    identifying, by the display system, a reading slot among the data packets based on the corresponding synchronization flag;
    storing, by the display system, the data packets in the cache area;
    sequentially reading, by the display system, the data packets from the cache area based on the reading slot using the second time sequence controller; and
    identifying, by the display system, the display location on the display panel based on the corresponding synchronization flag in the data packet to display each piece of the display data.

6. The method of claim 5, wherein obtaining the several lines comprises:
    reading, by the processor, second lines of data in the image data based on a preset sending slot using the first time sequence controller to generate the data block.

7. The method of claim 6, wherein sequentially sending the data packets corresponding to the display data to the display system comprises sequentially sending, by the processor, the data packets to the display system based on the preset sending slot.

8. The method of claim 1, further comprising:
    setting, by the processor, the synchronization flag as a value of a preset first field in a data packet template; and
    adding, by the processor, the data block to a preset second field in the data packet template to obtain the data packet.

9. The method of claim 8, wherein the display system comprises a cache area, and wherein the method further comprises:
    identifying a reading slot among the data packets based on the corresponding synchronization flag;

storing, by the display system, the data packets in the cache area;

sequentially reading, by the display system, the data packets from the cache area based on the reading slot using the second time sequence controller; and identifying, by the display system, the display location on the display panel based on the corresponding synchronization flag to display each piece of the display data.

10. An electronic device comprising:
one or more processors configured to:
- obtain lines of data in display data to generate a data block;
- generate a synchronization flag corresponding to the data block;
- sequentially extract, by a first time sequence controller of the processor, all frames of image data from the display data at a preset refresh frequency;
- encapsulate the data block and the synchronization flag to obtain a data packet corresponding to the data block; and
- sequentially send all data packets corresponding to the display data to the display system; and a display system coupled to the one or more processors and configured to:
- sequentially parse, by a second time sequence controller of display system, the data packets to obtain a second data block and a corresponding synchronization flag in each data packet; and
- identify a display location of the second data block on a display panel of the display system based on the corresponding synchronization flag to display the display data.

11. The electronic device of claim 10, wherein the one or more processors are further configured to:
- set the synchronization flag as a value of a preset first field in a data packet template; and
- add the data block to a preset second field in the data packet template to obtain the data packet.

12. The electronic device of claim 10, wherein the one or more processors are further configured to:
read second lines of data in the image data based on a preset sending slot using the first time sequence controller to generate the data block.

13. The electronic device of claim 12, wherein the one or more processors are further configured to sequentially send all the data packets to the display system based on the preset sending slot.

14. The electronic device of claim 10, wherein the display system comprises a cache area, and wherein the one or more processors are further configured to:
- identify a reading slot among the data packets based on the corresponding synchronization flag;
- store, the data packets in the cache area;
- sequentially read the data packets from the cache area based on the reading slot using the second time sequence controller; and
- identify, the display location on the display panel based on the corresponding synchronization flag to display each piece of the display data.

15. The electronic device of claim 14, wherein one or more processors are further configured to:
read second lines of data in the image data based on a preset sending slot using the time sequence controller to generate the data block.

16. The electronic device of claim 10, wherein the one or more processors are further configured to sequentially send all the data packets to the display system based on the sending slot.

17. The electronic device of claim 10, wherein the one or more processors are further configured to:
- set the synchronization flag as a value of a preset first field in a data packet template; and
- add the data block to a preset second field in the data packet template to obtain the data packet.

18. The electronic device of claim 17, wherein the display system comprises a cache area, wherein the one or more processors are further configured to:
- identify a reading slot among the data packets based on the corresponding synchronization flag;
- store the data packets in the cache area;
- sequentially read the data packets from the cache area based on the reading slot using the second time sequence controller; and
- identify the display location on the display panel based on the corresponding synchronization flag in the data packet to display each piece of the display data.

19. A computer program product comprising computer-executable instructions that are stored on a non-transitory computer-readable medium and that, when executed by one or more processors, cause an electronic device to:
- obtain lines of data in display data to generate a data block;
- generate a synchronization flag corresponding to the data block;
- sequentially extract, by a first time sequence controller of the one or more processors, all frames of image data from the display data at a preset refresh frequency;
- encapsulate the data block and the synchronization flag to obtain a data packet corresponding to the data block;
- sequentially send all data packets corresponding to the display data to a display system of the electronic device;
- sequentially parse, by a second time sequence controller of the display system, the data packets to obtain a second data block and a corresponding synchronization flag in each of the data packets; and
- identify a display location of the second data block on a display panel of the display system based on the corresponding synchronization flag to display the display data.

20. The computer program product of claim 19, wherein the computer-executable instructions, when executed by the one or more processors, further cause the electronic device to:
- set the synchronization flag as a value of a preset first field in a data packet template; and
- add the data block to a preset second field in the data packet template to obtain the data packet.

* * * * *